(12) United States Patent
Suemasu et al.

(10) Patent No.: US 12,152,330 B2
(45) Date of Patent: Nov. 26, 2024

(54) APPARATUS INCLUDING ACTUATOR AND/OR HEATER AND METHOD FOR CONTROLLING SAID APPARATUS

(71) Applicant: Panasonic Intellectual Property Corporation of America, Torrance, CA (US)

(72) Inventors: Satoshi Suemasu, Osaka (JP); Tatsuhiro Kishi, Kanagawa (JP); Kenta Murakami, Osaka (JP); Kazuki Sakamoto, Shiga (JP); Hayato Naruse, Shiga (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 53 days.

(21) Appl. No.: 18/070,796

(22) Filed: Nov. 29, 2022

(65) Prior Publication Data

US 2023/0088560 A1 Mar. 23, 2023

Related U.S. Application Data

(63) Continuation of application No. PCT/JP2021/022825, filed on Jun. 16, 2021.

(30) Foreign Application Priority Data

Jun. 19, 2020 (JP) ................. 2020-106607

(51) Int. Cl.
*D06F 33/50* (2020.01)
*F24C 7/08* (2006.01)
*D06F 105/50* (2020.01)

(52) U.S. Cl.
CPC ............ *D06F 33/50* (2020.02); *F24C 7/08* (2013.01); *D06F 2105/50* (2020.02)

(58) Field of Classification Search
CPC ........ G08C 17/00; G08C 17/02; G05B 19/00; G05B 19/042; G06F 19/00; D06F 34/28;
(Continued)

(56) References Cited

U.S. PATENT DOCUMENTS

| 5,771,174 A | * | 6/1998 | Spinner | ................ | D21G 9/0027 |
|---|---|---|---|---|---|
| | | | | | 709/201 |
| 2007/0159321 A1 | * | 7/2007 | Ogata | .................. | A61B 5/0002 |
| | | | | | 340/539.12 |
| 2013/0247117 A1 | * | 9/2013 | Yamada | .................... | H04B 5/72 |
| | | | | | 340/12.5 |

FOREIGN PATENT DOCUMENTS

JP 2003-284889 10/2003

OTHER PUBLICATIONS

NPL Search (Mar. 19, 2024).*
International Search Report issued Jul. 13, 2021 in International (PCT) Application No. PCT/JP2021/022825.

* cited by examiner

*Primary Examiner* — Van T Trieu
(74) *Attorney, Agent, or Firm* — Wenderoth, Lind & Ponack, L.L.P.

(57) ABSTRACT

An apparatus includes at least one of an actuator or a heater, and a controller that controls the at least one of the actuator or the heater. The controller: obtains an application defined by a plurality of blocks that drive the at least one of the actuator or the heater, each of the plurality of blocks including a parameter for driving the at least one of the actuator or the heater; consults a first rule that defines a first parameter range within which the at least one of the actuator or the heater is not permitted to be driven, and modifies the application by changing at least one block included in the plurality of blocks, the at least one block including a parameter included in the first parameter range; and drives
(Continued)

the at least one of the actuator or the heater based on the modified application.

15 Claims, 23 Drawing Sheets

(58) Field of Classification Search
CPC .. D06F 33/32; D06F 33/50; F24C 7/00; F24C 7/02; F24C 27/08
See application file for complete search history.

FIG. 19

| Type | Manufacturer name | Model number | Actuator / heater | Degradation level | Parameter range |
|---|---|---|---|---|---|
| Washing machine | Company A | WM-0001 | Motor MM0001 | 0 | (1000 rpm, +∞) |
| Washing machine | Company A | WM-0001 | Motor MM0001 | 1 | (800 rpm, +∞) |
| Washing machine | Company A | WM-0001 | Motor MM0002 | 0 | (500 rpm, +∞) |
| Washing machine | Company A | WM-0001 | Motor MM0002 | 1 | (400 rpm, +∞) |
| ... | ... | ... | ... | ... | ... |

APPARATUS INCLUDING ACTUATOR AND/OR HEATER AND METHOD FOR CONTROLLING SAID APPARATUS

CROSS REFERENCE TO RELATED APPLICATIONS

This is a continuation application of PCT International Application No. PCT/JP2021/022825 filed on Jun. 16, 2021, designating the United States of America, which is based on and claims priority of Japanese Patent Application No. 2020-106607 filed on Jun. 19, 2020. The entire disclosures of the above-identified applications, including the specifications, drawings, and claims are incorporated herein by reference in their entirety.

FIELD

The present disclosure relates to an apparatus including an actuator and/or a heater and a method for controlling said apparatus.

BACKGROUND

Conventionally, home appliances and housing equipment are controlled according to operating conditions (a control program) prepared in advance by, for example, the manufacturer. Patent literature (PTL) 1 (Japanese Unexamined Patent Application Publication No. 2003-284889) discloses a washing machine that allows the user to set operating conditions for a washing operation that he/she wishes to perform.

SUMMARY

Technical Problem

Unfortunately, with the conventional technology described above, the control program must be developed in advance by the product manufacturer and stored in the product in advance, making it difficult to customize and update the control program to meet the desires of various users.

In view of this, the present disclosure provides an apparatus and a method that can more easily and safely execute a wide variety of control programs.

Solution to Problem

An apparatus according to one aspect of the present disclosure includes: at least one of an actuator or a heater; and a controller that controls the at least one of the actuator or the heater. The controller: obtains an application defined by a plurality of blocks that drive the at least one of the actuator or the heater, each of the plurality of blocks including a parameter for driving the at least one of the actuator or the heater; consults a first rule that defines a first parameter range within which the at least one of the actuator or the heater is not permitted to be driven, and modifies the application by changing at least one block included in the plurality of blocks, the at least one block including a parameter included in the first parameter range; and drives the at least one of the actuator or the heater based on the application modified.

General or specific aspects of the present disclosure may be realized as a system, a method, an integrated circuit, a computer program, a computer readable medium such as a CD-ROM, or any given combination thereof.

Further benefits and advantages provided by the disclosed embodiments will be apparent from the specification and drawings. These benefits and advantages may be provided individually by the various embodiments and features of the specification and drawings; not all of the benefits and advantages necessarily need to be provided in order to obtain one or more benefits or advantages.

Advantageous Effects

An apparatus according to one aspect of the present disclosure can more easily and safely execute a wide variety of control programs.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 156 illustrates a sequence diagram for a system according to Variation 2 of Embodiment 1.

FIG. 19 illustrates an example of a rule database according to Embodiment 4.

DESCRIPTION OF EMBODIMENTS

Figure 1:
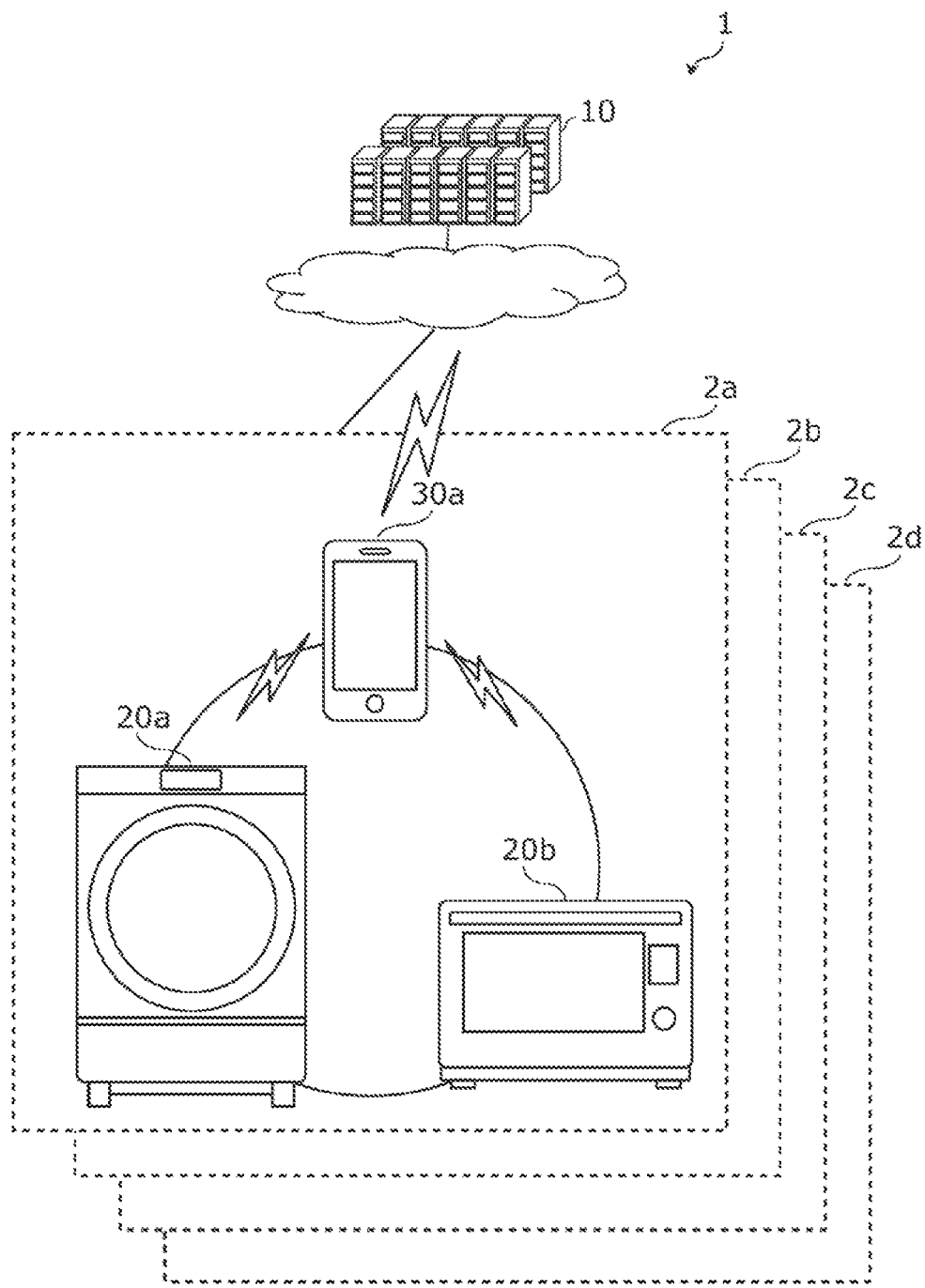
FIG. 1 illustrates the hardware configuration of a system according to Embodiment 1.

Underlying Knowledge Forming the Basis of the Present Disclosure

First, the process by which the inventors arrived at the present disclosure will be described. For home appliances or other products that include an actuator and/or a heater, there is a need for an open development environment to develop control programs that meet the desires of a variety of users. Stated differently, there is a need for an environment in which the difficulty of developing control programs is reduced and third parties can easily participate in the development of control programs. In such an environment, it would be possible, for example, for an apparel company to develop a control program for a washing machine to launder the clothes it sells.

In view of this, the inventors of the present application considered the creation of an environment in which control programs can be developed while maintaining safety assurance by using function blocks that abstract the control of actuators and/or heaters included in the product, and a system in which a control program consisting of a combination of a plurality of function blocks can be packaged and distributed as an application. This enables the distribution of a wide variety of applications and allows products to be customized and updated to meet the desires of a wider range of users. Unfortunately, in such an environment, dangerous applications (i.e., applications that cannot be safely controlled by the product) may be distributed, diminishing the safety of the product.

For example, it is envisioned that programs included in home appliances or other products would be incorporated into devices for direct control of actuators and/or heaters and would include a mixture of programs developed by the manufacturer and programs developed by third parties. In such cases, the manufacturer will likely not disclose to third parties all information on the home appliances or other products, including privy knowledge. For example, the parameters or timing of driving actuators and/or heaters is privy knowledge related to the performance of home appliances or other products made by the manufacturer, Manufacturers are therefore unlikely to divulge their privy knowledge to third parties so that they can freely drive their home appliances or other products, as this could cause them to lose their competitive edge.

The third parties may therefore create an application that includes a combination of controls or parameter ranges not anticipated by the manufacturer, i.e., an application with which safety cannot be guaranteed, due to lack of information about the home appliance or other product, From the perspective of the user, it is undesirable for such applications to be provided to users.

Manufacturers of home appliances or other products may attempt to improve users' lives by providing new control programs. However, the development of a wide variety of new control programs requires a great amount of man-hours to adjust parameters or evaluate hardware performance. Since the hardware of home appliances or other products is physically driven by actuators and/or heaters, one can easily expect that programs for home appliances or other products will require more man-hours for performance evaluation, etc., than programs for smartphones. However, in an age when on-demand development, rather than mass production, is required to meet the needs of each individual user's life, there is a need to develop a wide variety of control programs for home appliances or other products, similar to programs for smartphones. Manufacturers must therefore create a wide variety of applications that ensure the safety of their products with a reduction in the great amount of man-hours.

In addition, manufacturers may wish to ensure that their home appliances or other products operate safely even when operated using applications provided by third parties. In such cases, it is desirable to reduce the amount of work required to verify safety by actually driving home appliances or other products with a wide variety of applications.

In view of the above, the present disclosure provides an apparatus and the like that can more easily and safely execute a wide variety of applications defined by a plurality of function blocks that drive an actuator and/or a heater.

Hereinafter, embodiments will be described in detail with reference to the drawings.

Each of the exemplary embodiments described below shows a general or specific example. The numerical values, shapes, materials, dements, the arrangement and connection of the elements, steps, the processing order of the steps, etc., shown in the following exemplary embodiments are mere examples, and do not intend to limit the scope of claims.

The appended drawings are not necessarily precise depictions. In the drawings, dements that are essentially the same share like reference signs. Accordingly, duplicate description is omitted or simplified.

Embodiment 1

1.1 Hardware Configuration

Figure 2A:
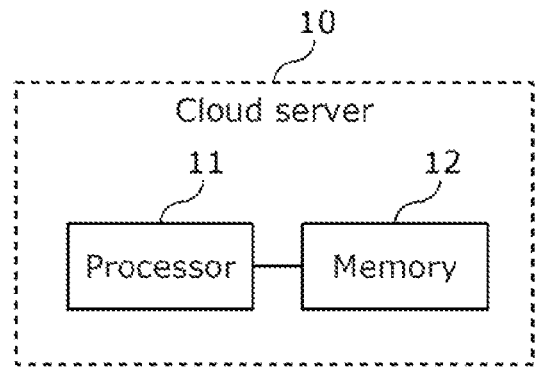
FIG. 2A illustrates the hardware configuration of a cloud server according to Embodiment 1.
Figure 2B:
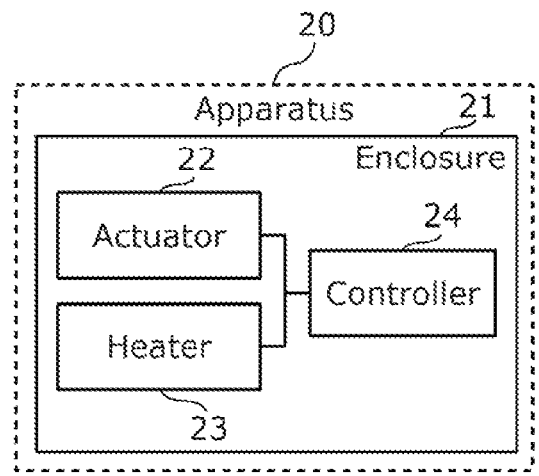
FIG. 2B illustrates the hardware configuration of an apparatus according to Embodiment 1.
Figure 2C:
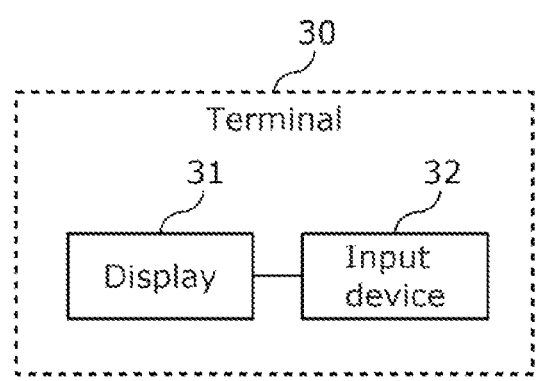
FIG. 2C illustrates the hardware configuration of a terminal according to Embodiment 1.

The hardware configuration of system 1 according to the present embodiment will be described with reference to FIG. 1 through FIG. 2C. FIG. 1 illustrates the hardware configuration of system 1 according to Embodiment 1. FIG. 2A illustrates the hardware configuration of cloud server 10 according to Embodiment 1. FIG. 2B illustrates the hardware configuration of apparatus 20 according to Embodiment 1, FIG. 2C illustrates the hardware configuration of terminal 30 according to Embodiment 1.

As illustrated in FIG. 1, system 1 according to the present embodiment includes cloud server 10, and apparatuses 20a through 20h and terminals 30a through 30d used in facilities 2a through 2d. For example, facilities 2a through 2d are, but not limited to, residences. For example, facilities 2a through 2d may be apartments, stores, offices, etc.

Cloud server 10 is a virtual server provided via a computer network (for example, the internet). Cloud server 10 is connected to apparatuses 20a through 20h and terminals 30a through 30d via the computer network. A physical server may be used instead of cloud server 10.

As illustrated in FIG. 2A, cloud server 10 includes, virtually, processor 11 and memory 12 connected to processor 11, Processor 11 functions as a sequence manager and a device manager, which will be described below, when instructions or a software program stored in memory 12 are executed.

Apparatuses 20a through 20h are electromechanical devices used in facilities 2a through 2d. Note that FIG. 1 omits the illustration of apparatuses 20c through 20h used in facilities 2b through 2d. Hereinafter, when it is not necessary to distinguish between apparatuses 20a through 20h, they will be referred to as apparatuses 20 or in the singular as apparatus 20.

Home appliances and housing equipment can be used as apparatuses 20. Home appliances and housing equipment are not limited to devices used in residences, and also include devices used in businesses. In the present disclosure, "home appliances and housing equipment or other products" may be shortened to "home appliances or other products". Home appliances include, for example, microwave ovens, rice cookers, blenders, electric ovens, electric toasters, electric hot water servers, hot plates, induction heating (IH) cookers, roasters, bread makers, electric pressure cookers, electric waterless cookers, multi-cookers, coffee makers, refrigerators, washing machines, dishwashers, vacuum cleaners, air conditioners, air purifiers, humidifiers, hair dryers, electric fans, and ion generators. Housing equipment include, for example, electric shutters, electronic locks, and electric water heaters for bathtubs. However, apparatuses 20 are not limited to these examples.

As illustrated in FIG. 2B, apparatus 20 includes enclosure 21, actuator 22, heater 23, and controller 24. Apparatus 20 need only include at least one of actuator 22 or heater 23, and need not include both actuator 22 and heater 23.

Enclosure 21 houses actuator 22, heater 23, and controller 24. Enclosure 21 may include an interior space for processing a target. For example, the drum of a washing machine, the cooking compartment of a microwave oven, and the inner pot of a rice cooker correspond to the interior space for processing a target.

Actuator 22 is a mechanical element that converts input energy into physical motion based on electrical signals. For example, electric motors, hydraulic cylinders, and pneumatic actuators can be used as actuator 22, but examples are not limited thereto.

Heater 23 is an electric heater that converts electrical energy into thermal energy. Heater 23 heats the target by, for example, Joule heating, induction heating, and/or dielectric heating. For example, nichrome wires, coils, and magnetrons can be used as heater 23.

Next, one example of why apparatus 20 according to the present disclosure includes actuator 22 and/or heater 23 will be given. Consider a case in which a manufacturer of home appliances or other products provides a third party with a development environment that allows free control of all parameters and combinations of drives for actuator 22 and heater 23. In such a case, the third party would be able to create a program to control actuator 22 and/or heater 23 so as to operate outside of the range of parameters anticipated by the manufacturer at which actuator 22 and/or heater 23 can be safely driven or outside the drive limits of actuator 22 and/or heater 23. In particular, the driving of actuator 22, which physically moves, or heater 23, which outputs thermal energy, in a manner unanticipated by the manufacturer poses significant safety assurance issues. Examples of driving in a manner unanticipated by the manufacturer include the high-speed rotation of an electric motor, which is one example of the actuator, and the supply of excessive current to heater 23. The inventors of the present application aimed to ensure that excessive safety considerations would not inhibit the creation of an environment that could provide users with a wide variety of applications, Apparatus 20 according to the present disclosure therefore is specific to actuators 22, which physically move, or heaters 23, output thermal energy, with an eye to ensuring safety.

Controller 24 is a controller that controls actuator 22 and/or heater 23 and functions as a device, which will be described later. Controller 24 is configured as, for example, an integrated circuit.

Terminals 30a through 30d are used at facilities 2a through 2d, respectively, and function as user interfaces. Note that FIG. 1 omits the illustration of terminals 30b through 30d used in facilities 2b through 2d. Hereinafter, when it is not necessary to distinguish between terminals 30a through 30d, they will be referred to as terminals 30 or in the singular as terminal 30.

Terminals 30 are connected to cloud server 10 and apparatuses 20 via the computer network and function as a user interface (UI), which will be described later, Portable information terminals such as smartphones and tablet computers can be used as terminals 30, Terminals 30 may be fixed to the wall, floor, or ceiling of facilities 2a through 2d. Terminals 30 may be included in apparatuses 20. For example, terminals 30 may be realized as a display terminal including a display built into apparatuses 20a through 20h.

As illustrated in FIG. 2C, terminal 30 includes display 31 and input device 32, For example, a liquid crystal display and an organic electroluminescent display can be used as display 31. For example, a touch panel, a keyboard, a mouse, and a mechanical button can be used as input device 32. A voice input device may be used as input device 32. Display 31 and input device 32 may be integrally implemented as a touch screen. Alternatively, a gesture input device may be used as input device 32, A gesture input device includes, for example, a camera and a recognition unit. The camera captures images containing gestures, and the recognition unit recognizes the gestures using the images.

1.2 Functional Configuration

Figure 3:
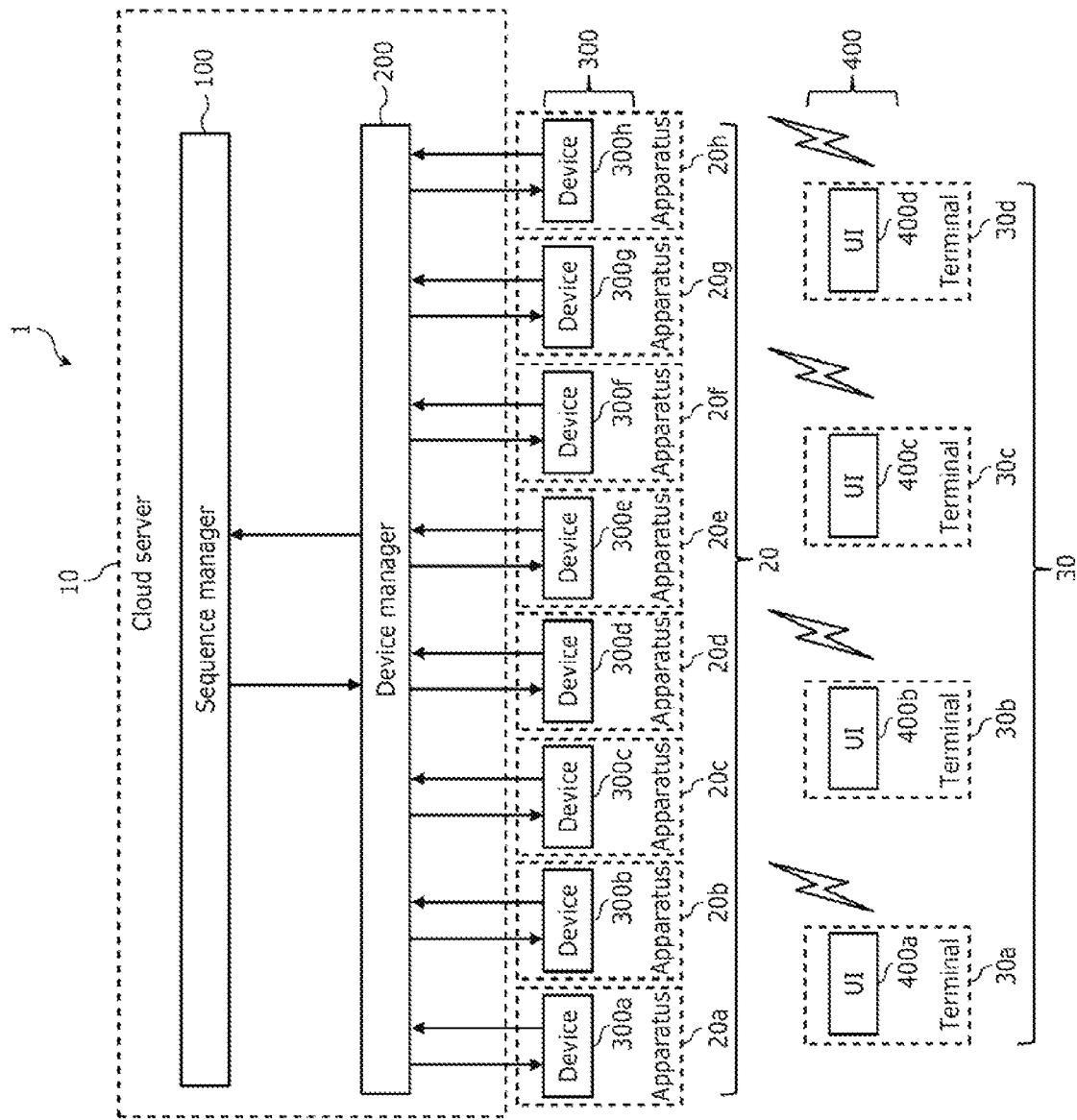
FIG. 3 illustrates the functional configuration of a system according to Embodiment 1.

Next, the functional configuration of system 1 according to the present embodiment will be described with reference to FIG. 3. FIG. 3 illustrates the functional configuration of system 1 according to Embodiment 1.

Cloud server 10 includes sequence manager 100 and device manager 200. Apparatuses 20a through 20h include devices 300a through 300h, respectively. Terminals 30a through 30d include UIs 400a through 400d, respectively.

Hereinafter, when it is not necessary to distinguish between devices 300a through 300h, they will be referred to as devices 300 or in the singular as device 300. Similarly, when it is not necessary to distinguish between UIs 400a through 400d, they will be referred to as UIs 400 or in the singular as UI 400.

Sequence Manager 100 manages a plurality of applications. The plurality of applications are downloaded to sequence manager 100 from an application delivery platform by, for example, user interaction. Alternatively, applications included in the application delivery platform may not be downloaded to sequence manager 100. In such cases, information indicating that the applications included in the application delivery platform are associated with it may be recorded in the database of sequence manager 100. The applications will be described in greater detail later.

Device Manager 200 includes a database for managing facilities 2a through 2d, as well as devices 300 and UIs 400 used at the respective facilities 2a through 2d, Device Manager 200 manages devices 300 and UIs 400 by recording device information and UI information associated with facilities 2a through 2d in a database. Device information and UI information includes, for example, control functions and drive functions, as well as operating status. For example, device manager 200 can manage the operating statuses of devices 300 and keep track of the operating schedules of devices 300. Device Manager 200 may manage log information for devices 300.

Such a database may be included in sequence manager 100 instead of device manager 200, or included in both sequence manager 100 and device manager 200.

Device 300 includes control functions and drive functions for apparatus 20, Device 300 can drive apparatus 20 according to instructions from device manager 200.

UI 400 provides information to the user and accepts inputs from the user.

Figure 4:
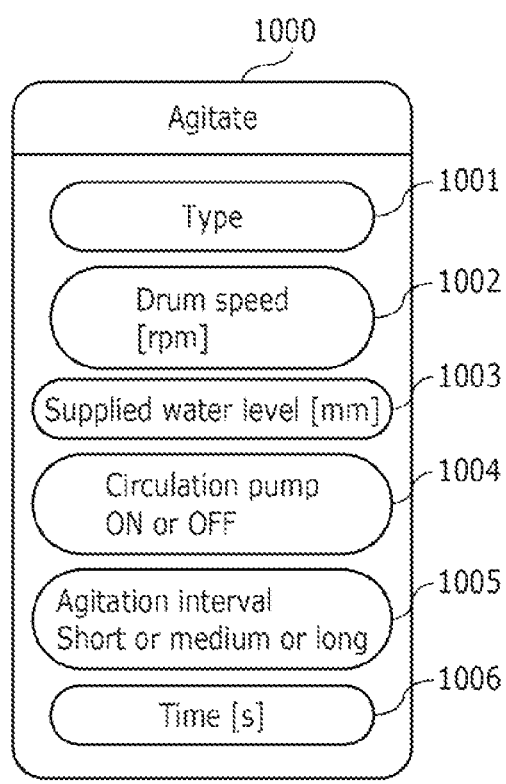
FIG. 4 illustrates one example of a block that defines an application according to Embodiment 1.

Next, the applications will be described. In the present embodiment, an application (hereinafter sometimes abbreviated as "app") means a control program defined by a plurality of function blocks (hereinafter abbreviated as "blocks") that drive actuator 22 and/or heater 23. Each of the blocks can include a parameter for driving actuator 22 or heater 23. More specifically, each of the blocks is an abstraction of the control of actuator 22 or heater 23. In addition to the blocks that drive actuator 22 and/or heater 23, the application may include blocks that do not drive actuator 22 and/or heater 23. Examples of blocks that do not drive actuator 22 and/or heater 23 include the displaying of information using an interface included in device 300, the outputting of sound using a buzzer included in device 300, and the turning on or off of a lamp included in device 300. The block may include a condition to start driving actuator 22 or heater 23. For example, assume an application includes a first block and a second block. Here, when switching to the second block during the execution of the first block, when the start condition included in the second block is met, the second block is switched to from the first block. The block may also contain an end condition rather than a start condition. Here, when switching to the second block during the execution of the first block, when the end condition included in the first block is met, the second block is switched to from the first block, FIG. 4 illustrates one example of a block that defines an application according to Embodiment 1. Block 1000 illustrated in FIG. 4 controls the agitation operation of a washing machine and includes parameters 1001 through 1006. Parameter 1001 includes information indicating the type of agitation (for example, normal, "dancing", or rocking). In other words, parameter 1001 can be said to indicate the type of function. Parameter 1002 includes a value indicating the drum speed. In other words, parameter 1002 can be said to indicate the intensity of the driving of actuator 22 and/or heater 23. Parameter 1003 includes a value indicating the amount of water supplied to the drum in terms of the water level after the water has been supplied. In other words, parameter 1003 can be said to indicate the state after the driving of actuator 22 and/or heater 23. Parameter 1004 includes a value indicating whether the circulation pump is on or off. In other words, parameter 1004 can be said to indicate whether to drive actuator 22 and/or heater 23, Parameter 1005 includes information indicating the agitation interval in terms of stages (for example, short, medium, long). Parameter 1006 includes a value indicating the agitation time.

Figure 6:
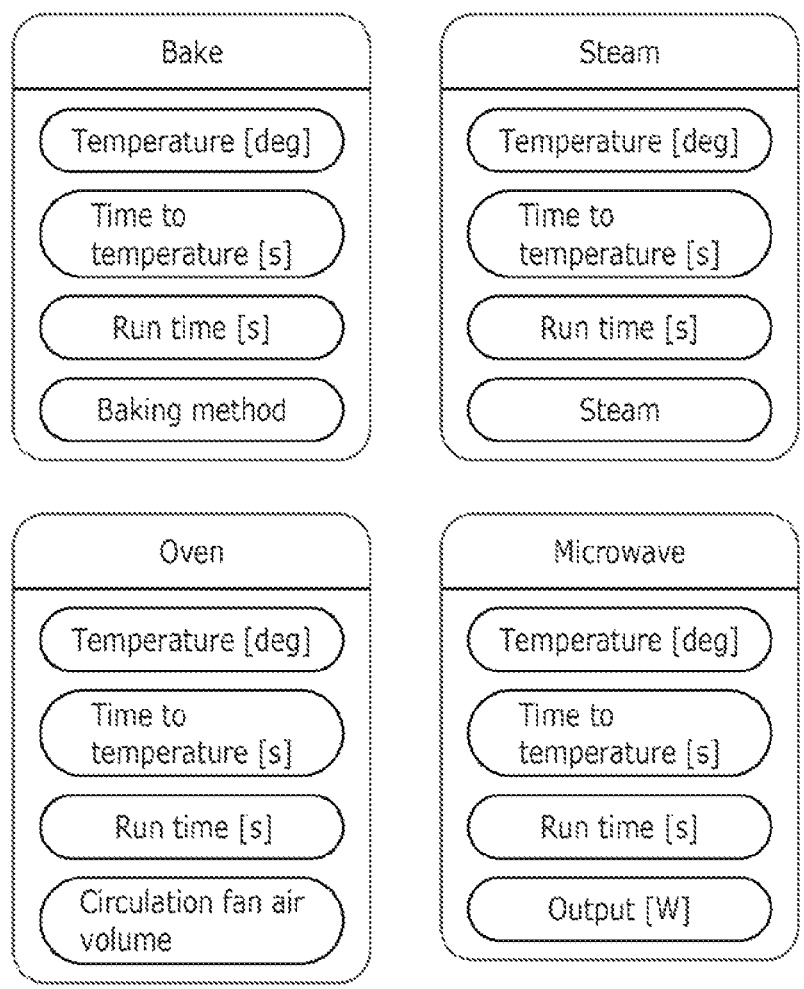
FIG. 6 illustrates a plurality of blocks for a microwave oven according to Embodiment 1.
Figure 7:
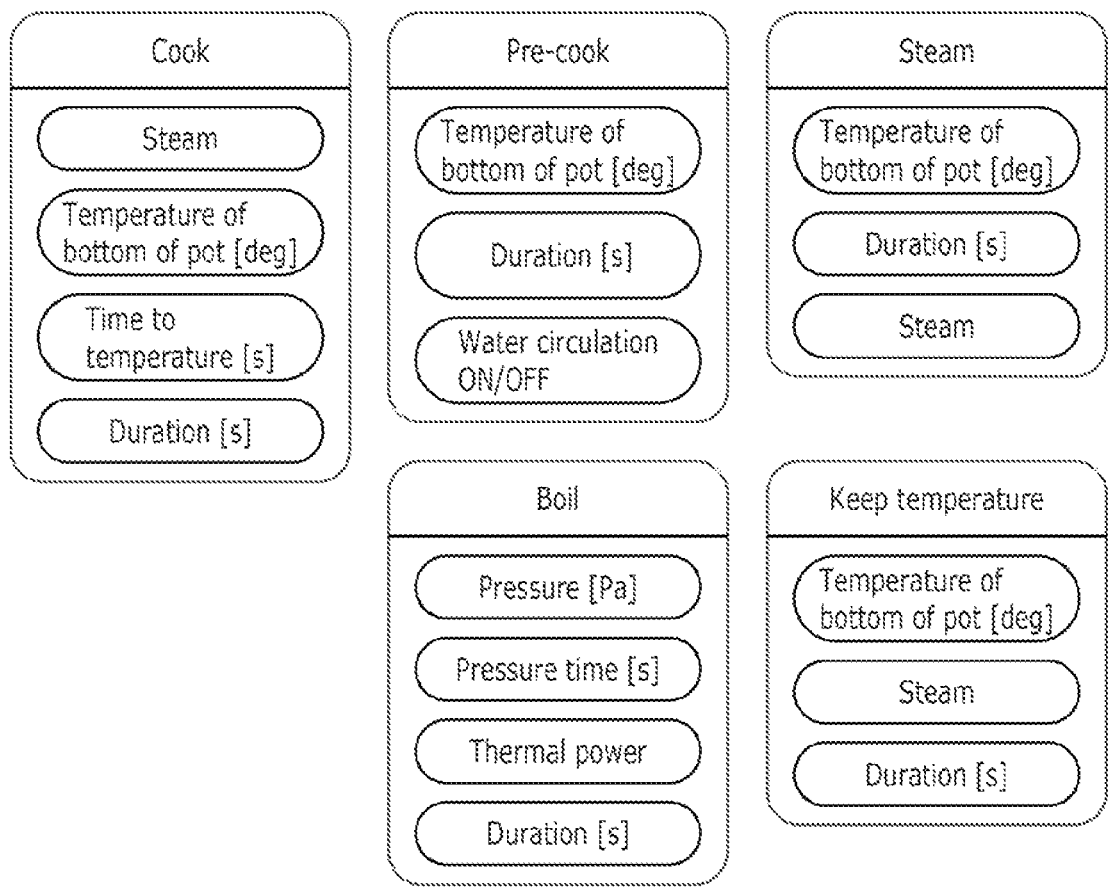
FIG. 7 illustrates a plurality of blocks for a rice cooker according to Embodiment 1.

A plurality of such blocks are used to define the application. For example, a plurality of blocks such as those illustrated in FIG. 5 through FIG. 7 are used.

Figure 5:
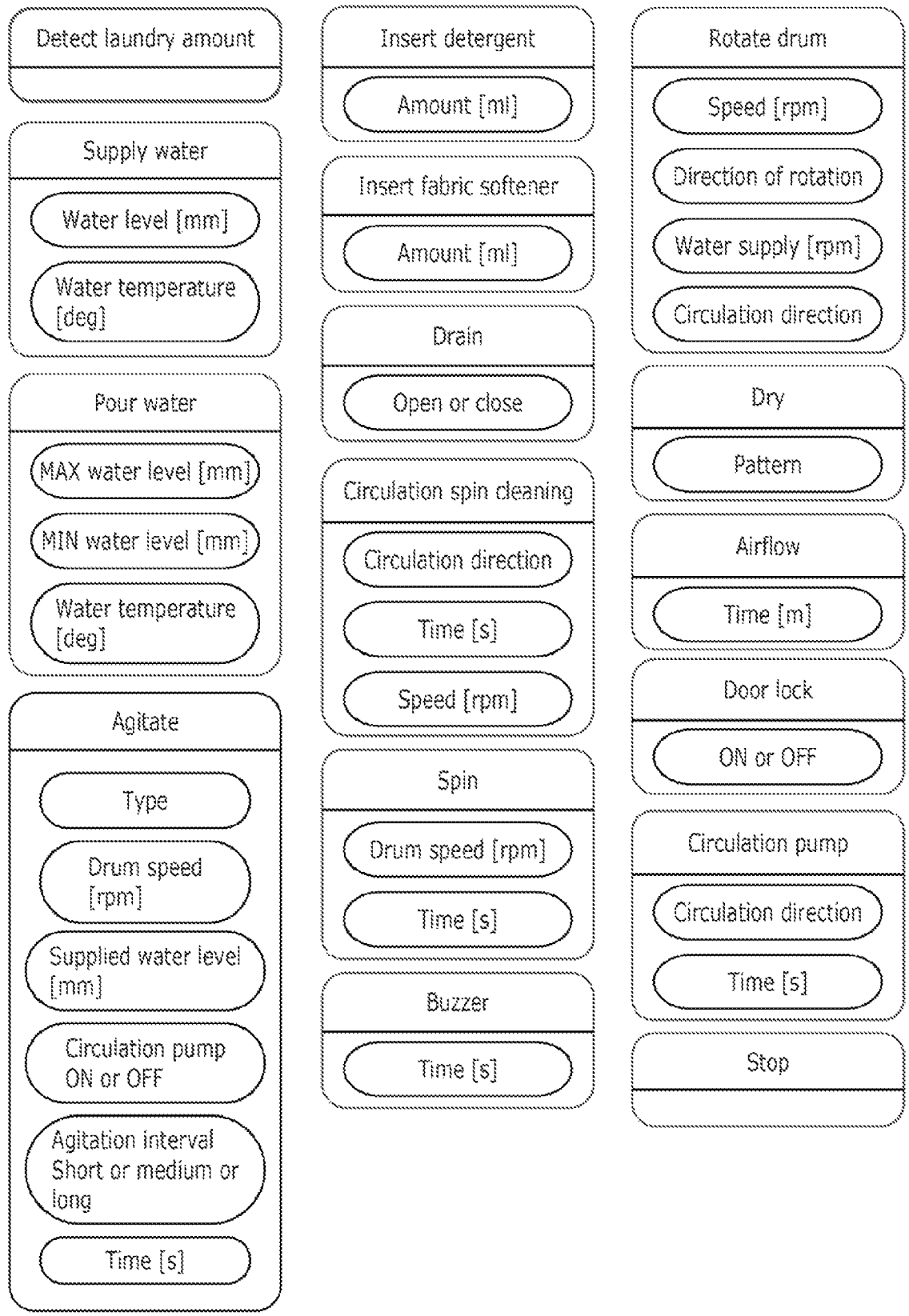
FIG. 5 illustrates a plurality of blocks for a washing machine according to Embodiment 1.

FIG. 5 illustrates a plurality of blocks for a washing machine according to Embodiment 1. FIG. 6 illustrates a plurality of blocks for a microwave oven according to Embodiment 1. FIG. 7 illustrates a plurality of blocks for a rice cooker according to Embodiment 1. The plurality of blocks illustrated in FIG. 5 through FIG. 7 are merely examples; blocks for a washing machine, a microwave oven, and a rice cooker are not limited to these examples. For example, the plurality of blocks may be hierarchized by abstraction level.

For example, the abstraction level may be changed between a level for manufacturers and a level for non-manufacturers, Examples of a level for non-manufacturers include a level for other manufacturers and a level for third parties. Here, the level for manufacturers is less abstract than the level for non-manufacturers. A low level of abstraction means that the control content is close to the parameters that drive the actuator and the heater.

On the other hand, for non-manufacturers, the manufacturer provides blocks with the minimum level of abstraction that ensures privy knowledge stays privy and guarantees safety, thereby enabling non-manufacturers to develop applications. The manufacturer can provide blocks with an even higher level of abstraction to ordinary users to enable even more people to develop applications. For example, a higher level of abstraction corresponds to blocks defined in terms that can be understood by ordinary users without specialized knowledge. Terms that can be understood without specialized knowledge are those that correspond to the functionality of the home appliance or other product, for example. More specifically, if "plenty" is selected as the parameter for water amount in the "wash" block in a washing machine, in one low-abstraction layer, the water level parameter in the water supply block is increased from 60 mm to 100 mm, the rotation amount parameter in the agitate block is decreased from 120 rpm to 100 rpm, and so on. With this, rearranging blocks and changing parameters at a higher level of abstraction can be achieved with lower level of abstraction blocks. A plurality of blocks may be defined just like in FIG. 5 through FIG. 7 for apparatuses other than washing machines, microwave ovens, and rice cookers as well. These blocks allow for free development of applications by reconfiguring and adjusting parameters while ensuring the safety and confidentiality of the driving of the actuator and the heater drive.

In addition, by a manufacturer providing other manufacturers with blocks with the minimum level of abstraction that ensures privy knowledge stays privy and guarantees safety, the other manufacturers can define and implement their own blocks with an even lower level of abstraction in order to realize the provided blocks. This allows each manufacturer to freely develop apps for driving their actuators and heaters for third parties who only develop apps, while ensuring privy knowledge stays privy and guaranteeing safety.

At this time, the other manufacturers may, instead of developing blocks with an even lower level of abstraction corresponding to the blocks provided by the manufacturer that have the minimum level of abstraction that ensures privy knowledge stays privy and guarantees safety, return an error indicating to the app developer, and user, that the blocks provided by the manufacturer cannot be used or will operate within a restricted parameter range. More specifically, when "high speed" is selected as a parameter related to motor rotation in the "agitate" block in a washing machine, if the parameter of 150 rpm to achieve "high speed" is feasible in the manufacturer's washing machine, while the motor of the washing machine of another manufacturer can only rotate up to 120 rpm, the app developer or user is presented with an error or notification of a limit of 120 rpm.

1.3 Processes

Figure 8:
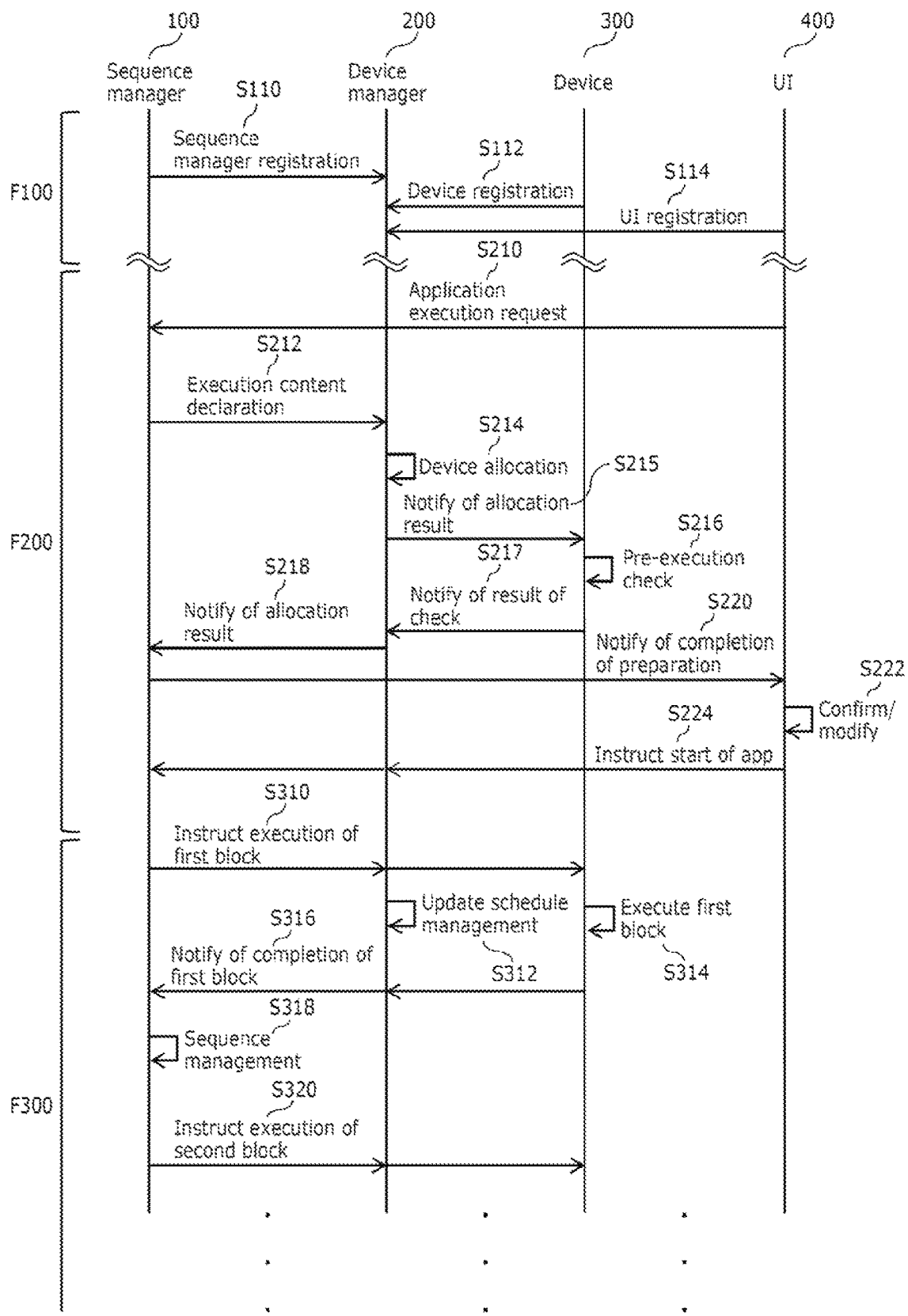
FIG. 8 is a sequence diagram of a system according to Embodiment 1.

Next, processes performed by system 1 configured as described above will be described with reference to FIG. 8. FIG. 8 is a sequence diagram of system 1 according to Embodiment 1.

1.3.1 Preparation Phase F100

First, preparation phase F100 will be described.

Step S110

Sequence manager 100 transmits sequence manager information to device manager 200, This transmission of sequence manager information is performed, for example, by instruction of the system administrator, Device manager 200 registers the received sequence manager information in a sequence manager database, for example. This step may be skipped if the sequence manager information is already registered in the sequence manager database.

The sequence manager information includes, for example, an identifier and/or an address of sequence manager 100 (for example, the uniform resource locator (URL) or Internet protocol (IP) address or the like). Sequence manager information may further include any sort of information.
Step S112
Device 300 transmits device information 1101 to device manager 200. This transmission of device information 1101 is done, for example, when device 300 is connected to a computer network. Device Manager 200 registers the received device information 1101 in device database 1100. This step may be skipped if device information 1101 is already registered in device database 1100.

Device information 1101 may be sent to UI 400 and then registered in device manager 200 via UI 400.

Figure 9:
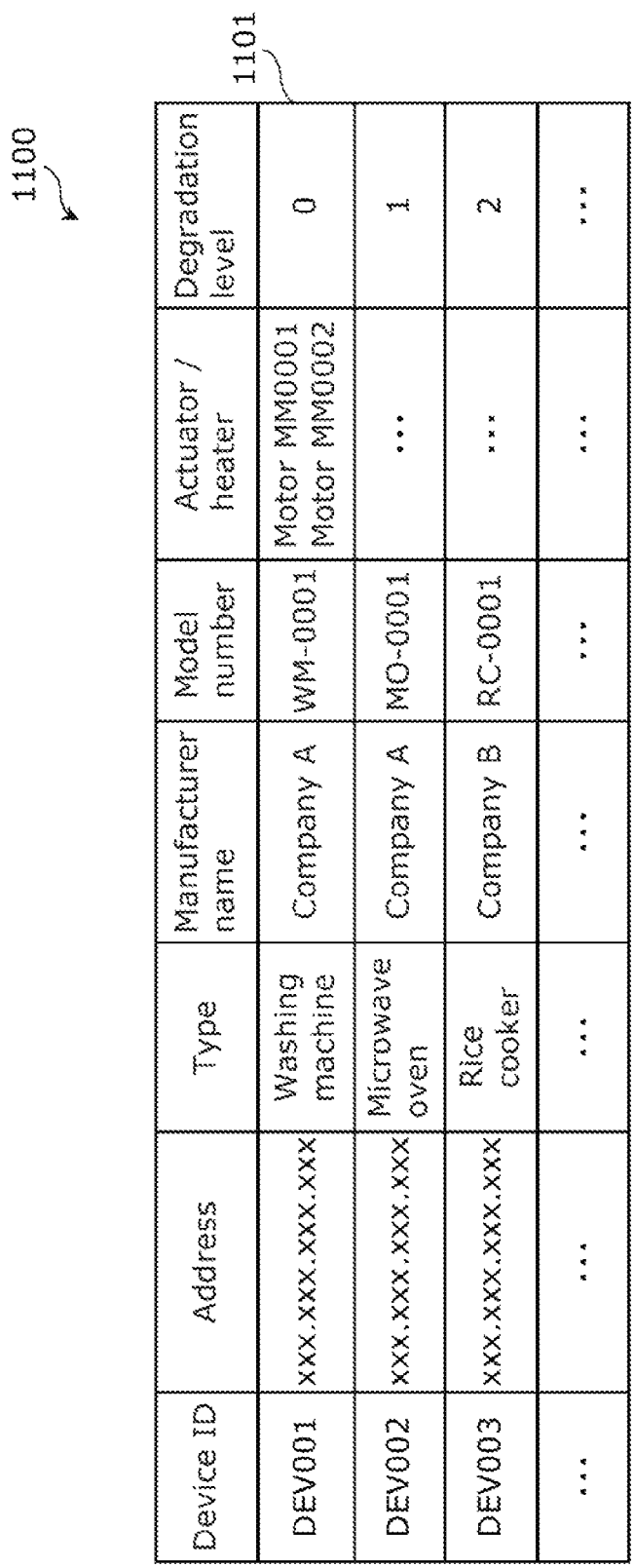
FIG. 9 illustrates one example of a device database according to Embodiment 1.

Device information 1101 includes an identifier and/or an address of device 300. Device information 1101 may further include any sort of information. FIG. 9 illustrates one example of a device database according to Embodiment 1. A plurality of items of device information, including device information 1101, are registered in device database 1100 in FIG. 9. Each item of device information includes a device ID, an address, a type, a manufacturer name, a model number, actuator/heater, and a degradation level. Actuator/heater is information identifying actuator 22 and/or heater 23 included in device 300. The degradation level is one example of degradation information that indicates whether actuator 22 and/or heater 23 included in device 300 has degraded or not. Here, a higher degradation level indicates more degradation. Device information 1101 may include information about executable blocks. Information about executable blocks may be information that specifies blocks in the database as executable or non-executable, or it may be information about executable blocks only. Whether a block is executable or not can be prepared in advance based on information such as the actuator/heater information included in device information 1101. Device information 1101 may include information that can identify facilities 2a through 2d.

Step S114

UI 400 transmits UI information to device manager 200. This UI information is transmitted, for example, by user instruction, Device manager 200 registers the received UI information in a UI database, for example. This step may be skipped if the UI information is already registered in the UI database.

UI information 1101 includes an identifier and/or an address of UI 400, for example. The UI information may further include any sort of information.

The UI information may include information that can identify facilities 2a through 2d.

Through the above processes, sequence manager 100, device manager 200, device 300, and UI 400 can be associated with each other and establish a connection with each other. This completes preparation phase F100.

1.3.2 App Pre-Execution Phase F200

Next, app pre-execution phase F200 will be described, Prior to app pre-execution phase F200, the application is downloaded from the application delivery platform to sequence manager 100 in accordance with instructions from the user received via UI 400. With the application downloaded to sequence manager 100, the following processes are performed.

Step S210

UI 400 accepts an app execution request from the user and transmits the app execution request including information identifying the application to sequence manager 100. For example, the user selects an application from among several applications downloaded to sequence manager 100 via UI 400, and instructs the execution of the selected application.

The app execution request transmitted from UI 400 to sequence manager 100 is transmitted as a set with information that can identify facilities 2a through 2d.

The app execution request does not have to be explicitly accepted from the user. For example, the user's behavior or state may be detected and an app execution request may be automatically transmitted to sequence manager 100 based on the detection results.

Step S212

Sequence manager 100 transmits the execution content declaration of the application identified by the app execution request to device manager 200. The execution content declaration includes information on the plurality of blocks that define the application to be executed and information that can identify facilities 2a through 2d.

Figure 10:
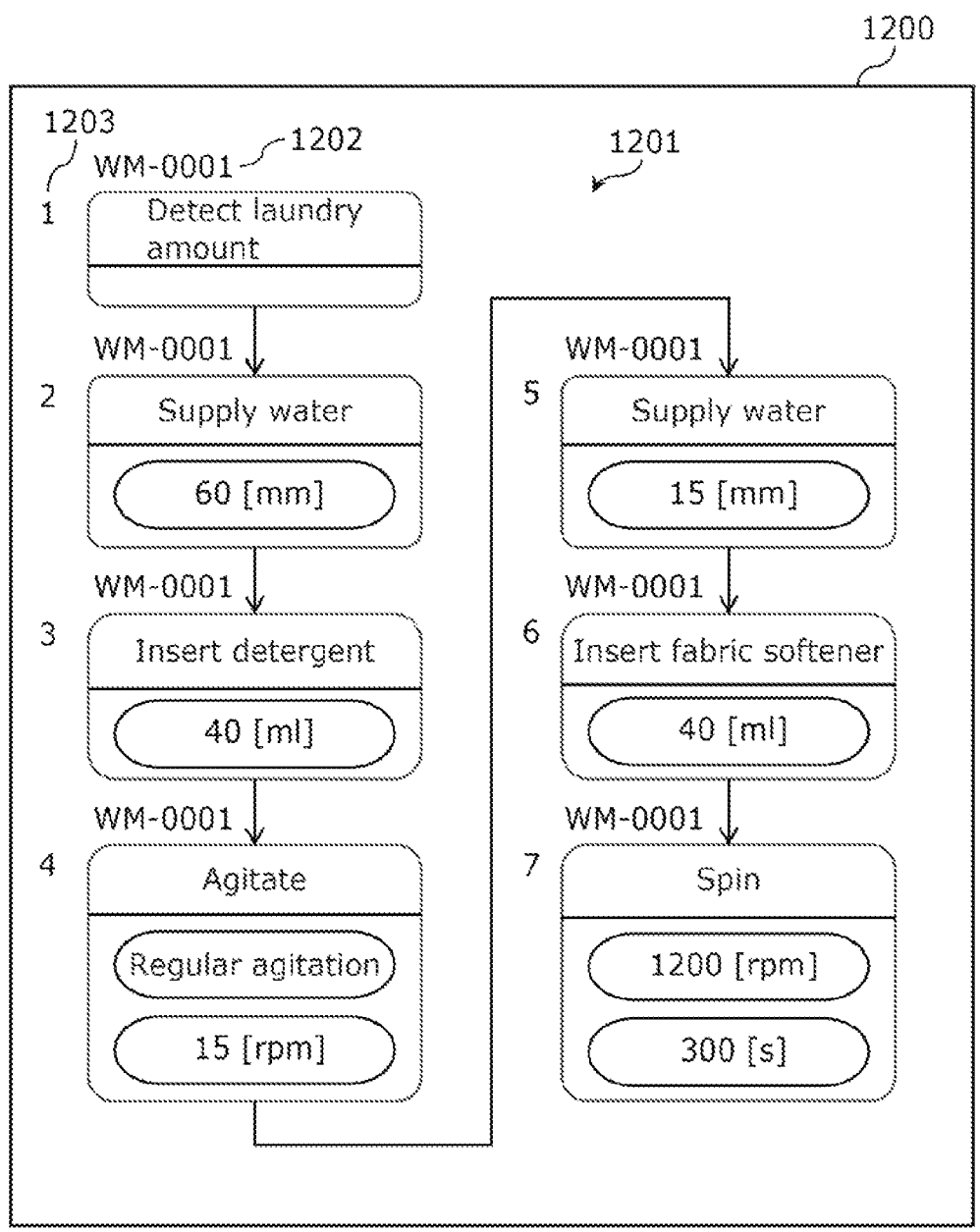
FIG. 10 illustrates one example of an execution content declaration according to Embodiment 1.

FIG. 10 illustrates one example of an execution content declaration according to Embodiment 1. FIG. 10 illustrates execution content declaration 1200 for the application defined by combining a plurality of blocks for the washing machine illustrated in FIG. 5. Execution content declaration 1200 includes a plurality of blocks 1201, information 1202 about the device required to execute each block 1201, and information 1203 on the order in which blocks 1201 are to be executed.

Execution content declaration 1200 does not need to include information 1202 about the device. In such cases, device manager 200 needs to search for a device that can execute the relevant block at the facility indicated by the received facility information from information about the plurality of blocks 1201 and perform device allocation.

In FIG. 10, information 1202 about the device indicates the model number of device 300, but information 1202 is not limited to this example. Information 1202 about the device may be any information that can indicate a condition for device 300 that can be assigned to the block. For example, information 1202 about the device may include a plurality of model numbers, or may include only the type of device, intended use, device location, or any combination of these.

Step S214

Device manager 200 allocates device 300 associated with device manager 200 to each block in the execution content declaration, based on information that can identify facilities 2a through 2d. For example, device manager 200 allocates, to each of the plurality of blocks 1201 illustrated in FIG. 10, device DEV001 having a model number of WM-0001, which is registered in device database 1100 in FIG. 9 as being connected to the facility indicated by the received facility information. If the operational status of device 300 or its connection to the cloud is managed, the allocation of a device 300 that is in operation may be prohibited.

For example, if the plurality of blocks illustrated in FIG. 10 are not registered as being connected to the facility indicated by the received facility information, i.e., if the target device does not exist at this facility, device manager 200 notifies sequence manager 100 of whether the application corresponding to the execution content declaration is executable or not.

Step S215

Device manager 200 notifies devices 300 of the result of the device allocation. This transmits the respective blocks included in the application to the respective allocated devices 300.

Step S216

Device 300 checks a block before it is executed. Stated differently, before executing a block, device 300 checks to see if any problems will arise in device 300 if the block is executed. For example, device 300 checks for safety and/or efficiency issues.

Device 300 then changes the block based on the result of the check. This corrects the blocks so that problems do not arise.

Figure 11:
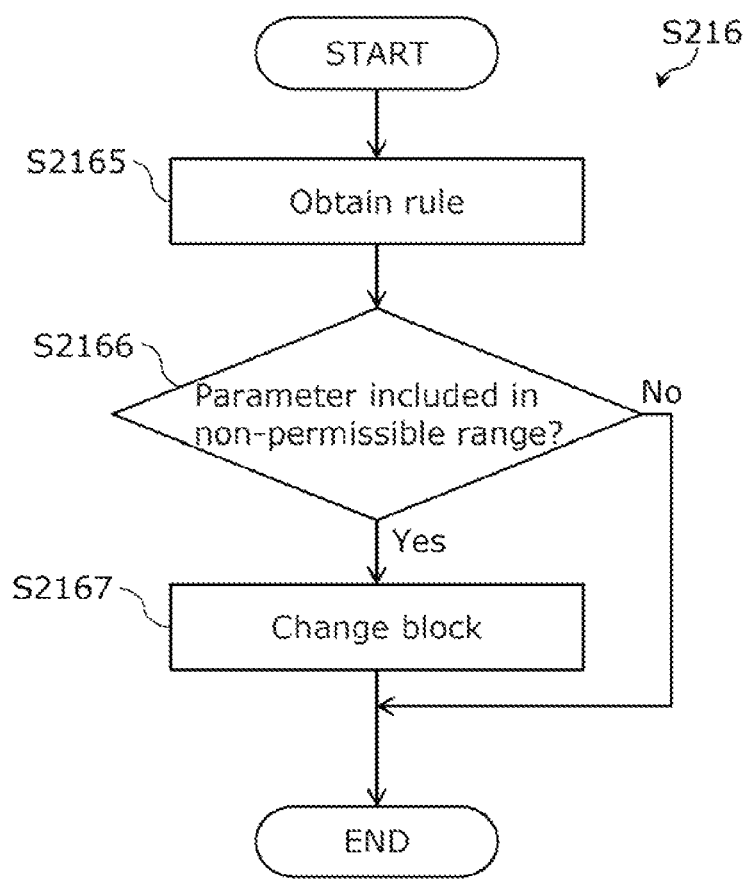
FIG. 11 illustrates a flowchart of a pre-execution check process according to Embodiment 1.

This pre-execution check process will be described in greater detail with reference to FIG. 11. FIG. 11 illustrates a flowchart of the pre-execution check process according to Embodiment 1.

Step S2165

Device 300 obtains a rule corresponding to a block. The rule defines a parameter range within which at least one of actuator 22 or heater 23 is not permitted to be driven (hereafter referred to as a non-permissible range). For example, device 300 consults the rule database to obtain a parameter range corresponding to actuator 22 or heater 23 that the block drives. For example, the rule database may be included in device 300, and may be included in sequence manager 100 or device manager 200.

Figure 12:
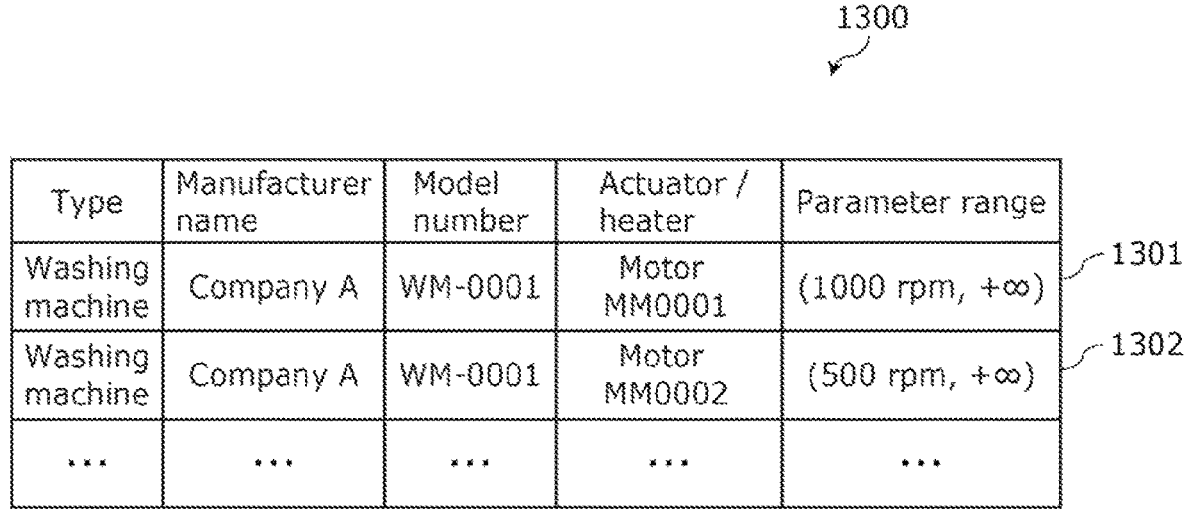
FIG. 12 illustrates one example of a rule database according to Embodiment 1.

FIG. 12 illustrates an example of a rule database according to Embodiment 1. Rules 1301 and 1302 are registered in rule database 1300 in FIG. 12. Each of rules 1301 and 1302 includes a parameter range that defines a non-permissible range. For example, rule 1301 includes a range greater than 1000 rpm as a non-permissible range.

For example, a parameter range that allows the interior space of enclosure 21, allows actuator 22, or allows heater 23 to reach its maximum withstand temperature is predefined as such a non-permissible range. A maximum withstand temperature refers to the rated temperature and indicates the maximum tolerable temperature. Therefore, if actuator 22 or heater 23 is driven with a parameter in the non-permissible range, the temperature of the interior space of enclosure 21, the temperature of actuator 22, or the temperature of heater 23 will reach an unacceptable temperature.

In FIG. 12, each of rules 1301 and 1302 includes a non-permissible range as a parameter range, but this example is non-limiting. For example, each of rules 1301 and 1302 may include, as the parameter range, a parameter range within which actuator 22 or heater 23 is permitted to be driven (hereafter referred to as a permissible range). Even in this case, each of rules 1301 and 1302 may define, as the non-permissible range, a range excluding the permissible range. The permissible range is defined as a range within which actuator 22 or heater 23 can be safely driven. Furthermore, the permissible range is defined such that a wide range of parameters can be used for the development of a wide variety of applications.

For example, the parameters by which actuator 22 or heater 23 can be safely driven may vary depending on the environment of device 300, such as the interior space of enclosure 21, and the permissible range may not depend solely on the performance of actuator 22 or heater 23 itself. Therefore, in order to ensure safe driving in any environment, the permissible range is heavily weighted in favor of safety, which reduces the freedom for development of a wide variety of applications. The rules may therefore be independent of the application and may be associated with information on, for example, device 300, The use of such rules allows for both safety and the development of a wide variety of applications.

The rules relate to the range within which actuator 22 or heater 23 can be safely driven. The range within which actuator 22 or heater 23 can be safely driven may be a range that takes into account the start condition or the end condition of the block. Consider an example including a first block and a second block that is executed after the first block, A rule (a permissible range) could be set for a case in which the first block is to be executed until the start condition of the second block is reached, whereby actuator 22 or heater 23 is loaded with a load that affects safety. Stated differently, the permissible range depends on the performance of actuator 22 or heater 23, the start condition or the end condition of the block, etc.

For example, the permissible range or the non-permissible range may be defined by a combination of a plurality of parameters. More specifically, the permissible range or the non-permissible range may be a range of output values of a plurality of parameter functions. For example, if device 300 is a washing machine, the permissible range or non-permissible range may be a range of output values of a function of a first parameter indicating water level and a second function indicating motor speed. The function can be predetermined empirically and/or experimentally, Instead of a function, a permissible range or non-permissible range may be defined by a collection of a plurality of combinations of parameter values.

Each of rules 1301 and 1302 further includes the type, the manufacturer name, the model number, and actuator/heater. This allows device 300 to obtain, from rule database 1300, rules corresponding to actuator 22 or heater 23 that is driven by the block. For example, device 300 consults rule database 1300 in FIG. 12, and obtains rules 1301 for the spin block in FIG. 10.

Step S2166

Device 300 determines if the parameters included in the block are within the non-permissible range. If device 300 determines that the parameters are not within the non-permissible range (No in S2166), device 300 skips the subsequent step S2167 and ends the pre-execution check process. However, if device 300 determines that the parameters are within the non-permissible range (Yes in S2166), device 300 proceeds to the next step S2167.

Step S2167

Device 300 changes the block and ends the pre-execution check process. Changing a block means changing the contents of the block, removing the block, adding a new block before or after the block, or any combination thereof.

For example, device 300 can change a block by changing the parameters of the block to parameters that are within the permissible range. A specific example of such a change to a block will be described with reference to FIG. 13.

Figure 13:
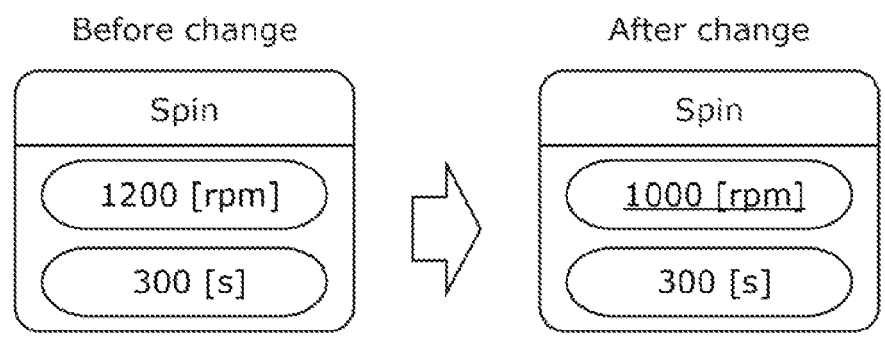
FIG. 13 illustrates one example of changing the order of blocks according to Embodiment 1.

FIG. 13 illustrates one example of changing a block according to Embodiment 1. In FIG. 13, since the speed parameter in the spin block is included in the non-permissible range, it is changed to a parameter that is included in the permissible range (from 1200 rpm to 1000 rpm).

Figure 14:
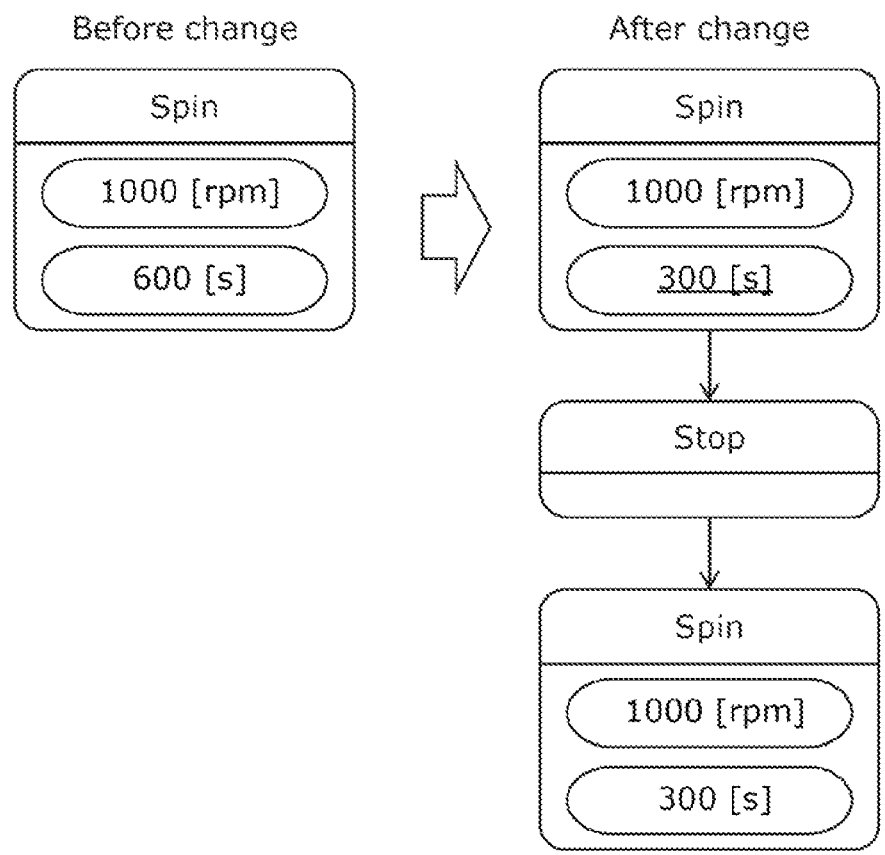
FIG. 14 illustrates one example of changing a block according to Embodiment 1.

For example, device 300 can also change a block by changing the parameters of the block to parameters that are within the permissible range and adding a new block. A specific example of such a change to a block will be described with reference to FIG. 14, FIG. 14 illustrates one example of changing a block according to Embodiment 1. In FIG. 14, since the time parameter in the spin block is included in the non-permissible range, it is changed to a parameter included in the permissible range (from 600 s to 300 s), and a stop block and spin block are added after the spin block. For example, by changing a block that unintentionally places a load on device 300 by spinning the wash tank at high speed for a long time during the spin operation, the load can be reduced, a stop added, and the spin block performed again, allowing the application to safely perform the functions defined in the application before the change.

For example, device 300 can also change a block by removing it.

Although the changing of a block for a washing machine is described here, a block can be changed for other apparatuses in the same manner as well.

For example, in a microwave oven, if a temperature parameter is in the non-permissible range, the temperature parameter may be changed to a temperature parameter that is in the permissible range. If a run time parameter is in the non-permissible range, the run time parameter may be changed to a run time parameter that is in the permissible range and a new block may be added.

In a rice cooker, if the parameter for the temperature of the bottom of the pot is included in the non-permissible range, the parameter for the temperature of the bottom of the pot may be changed to a parameter that is included in the permissible range. If a duration parameter is in the non-permissible range, the duration parameter may be changed to a duration parameter that is in the permissible range and a new block may be added.

Step S217

Device 300 transmits the result of the pre-execution check to device manager 200. If a block has been modified, the modified block may be transmitted to device manager 200.

Step S218

Device manager 200 responds to sequence manager 100 with the result of the device allocation. If the block has been modified in the pre-execution check, the application including the modified block may be transmitted to sequence manager 100.

Step S220

Sequence manager 100 receives a notification of the allocation result from device manager 200 and notifies the user that execution preparation is complete via UI 400.

Step S222

UI 400 displays a list of devices on which the application will be executed and a graphical user interface (GUI) for accepting input from the user to confirm execution of the application. UI 400 may accept device allocation changes from the user. Moreover, UI 400 does not need to display a list of devices.

Step S224

UI 400 receives execution confirmation input from the user and transmits an instruction to start the app to device manager 200. Device manager 200 forwards the instruction to start the app to sequence manager 100.

Steps S220, S222, and S224, which again provide information to the user before the application is executed, may be omitted because they may increase the user's workload.

This completes app pre-execution phase F200.

1.3.3 App Execution Phase F300

Next, app execution phase F300 will be described.

Step S310

Sequence manager 100 receives the instruction to start the app and selects the initial block (the first block) from among the plurality of blocks included in the application. Sequence manager 100 then transmits an instruction to execute the selected first block to device manager 200.

When a plurality of blocks operate consecutively, sequence manager 100 may send instructions to execute the plurality of blocks together to device manager 200.

Device manager 200 transmits the instruction to execute the first block to device 300 allocated to the first block, based on the instruction to execute the first block received from sequence manager 100.

Step S312

Device manager 200 receives the instruction to execute the first block, and updates the schedule (scheduled time of use) for each device.

Step S314

Device 300 receives the instruction to execute the first block, and executes the first block.

Step S316

Device 300 transmits a notification of completion to device manager 200 when the execution of the first block is complete. If an error occurs during the execution of the first block, device 300 may send error information to device manager 200. Device 300 may send event information to device manager 200 during the execution of the first block. For example, sensor output values or device operations can be used as event information, but examples are not limited thereto, Device manager 200 forwards the notification of completion and/or the various information received from device 300 to sequence manager 100.

Step S318

Upon receiving the notification of completion of the first block, sequence manager 100 updates the application progress, and selects the next block (the second block). If sequence manager 100 receives error information, it executes a process corresponding to the error information (for example, return to the previous block, return to the first block, wait, etc.). Information on the process corresponding to the error information, for example, may be held in advance in sequence manager 100 or accepted from the user via UI 400. If sequence manager 100 receives event information, it executes a process corresponding to the event information. For example, if the event information includes the output value of the water level sensor, sequence manager 100 updates the water level parameter for indicating water level in the block being executed.

Step S320

Sequence manager 100 then transmits an instruction to execute the selected second block to device manager 200.

The instruction to execute the second block may be an instruction to the same device as the instruction to execute the first block (S310), or to a different device.

The instruction to execute the second block may be transmitted to device manager 200 in the same manner as the execution instructions for the first block—by transmitting instructions to execute a plurality of blocks together.

Subsequent processing is the same as for the first block (S312 through S318), so repeated illustration in the figures and explanation in the description are omitted. The blocks included in the application are executed in sequence, and when the execution of the last block is completed, app execution phase F300 ends.

Although the execution of blocks is exemplified as being instructed one by one in sequence, the execution of blocks is not limited to this example. For example, the execution of a plurality of blocks allocated with the same device may be instructed together. In such cases, it may be checked in advance whether each block satisfies the parameter range for executing its function, or a block corresponding to the change may be downloaded to the device before execution. For example, instructions to execute each of the blocks may be given to a plurality of devices.

1.4 Advantageous Effects, Etc

As described above, the application including one or more blocks and the rule database provide an environment in which a wide variety of applications can be developed, and for applications freely developed in that environment, actuator 22 that physically moves or heater 23 that outputs thermal energy can be safely driven. Stated differently, the application including one or more blocks and the rule database can provide an environment in which applications can be freely developed, while at the same time providing functions to ensure safety independent of the application. As a result, for example, the development of a wide variety of applications with a high degree of freedom and the development of a rule database to ensure safety can be created in parallel, enabling the early development of a wide variety of applications.

Even after the application is provided, the rule database can be modified to make the application more secure. In addition, even if a manufacturer needs to improve a situation that was not anticipated beforehand, the rule database is defined independently from the applications, so all applications can be supported by updating the rule database, without having to change a wide variety of applications themselves.

One conceivable measure is to store a rule base for error handling by detecting the state of the application when it is executed, without modifying the application itself. However, this measure invariably means dealing with the error condition after it has occurred, allowing a situation where the home appliance is overloaded or a situation where safety cannot be guaranteed. It therefore possible to include a rule database independent of the applications, and to guarantee safety by modifying the application content by consulting the rule data.

Apparatus 20 according to the present embodiment includes: at least one of actuator 22 or heater 23, and controller 24 that controls the at least one of actuator 22 or heater 23. Controller 24 obtains an application defined by a plurality of blocks that drive the at least one of actuator 22 or heater 23. Each of the blocks includes a parameter for driving actuator 22 or heater 23. Controller 24 consults a first rule that defines a first parameter range in which the at least one of actuator 22 or heater 23 is not permitted to be driven, and modifies the application by changing at least one of the plurality of blocks. The at least one of the plurality of blocks includes a parameter included in the first parameter range, Controller 24 drives the at least one of actuator 22 or heater 23 based on the modified application.

This allows actuator 22 and/or heater 23 to be driven based on an application defined by a plurality of blocks. It is therefore is possible to develop applications using blocks that abstract the control of apparatus 20, allowing a wide variety of applications to be developed not only by the manufacturer but also by third parties, and these applications can be easily executed on apparatus 20, Furthermore, before actuator 22 and/or heater 23 is/are driven based on the application, a block including a parameter in the first parameter range that is not permitted can be changed. Thus, it is possible to inhibit actuator 22 and/or heater 23 from being driven at a non-permissible parameter. Stated differently, if an application developer mistakenly instructs the driving of actuator 22 and/or heater 23 at a non-permissible parameter, it is still possible to inhibit the execution of an application that cannot safely control apparatus 20. Thus, the application developer can improve the safety of apparatus 20 controlled by the application, even if the application is created with an emphasis on suitability for the user rather than ensuring the safety of actuator 22 and/or heater 23.

For example, in apparatus 20 according to the present embodiment, controller 24 may consult the first rule, and modify the application by changing a parameter included in the first parameter range to a parameter included in a range in which the at least one of actuator 22 or heater 23 is permitted to be driven.

With this, since a parameter included in the non-permissible first parameter range can be changed to a parameter included in the permissible range, for example, the application developer can lower the priority that takes into consideration the safe driving of actuator 22 and heater 23 to more freely develop the application, and furthermore, the developer of the software that is incorporated in apparatus 20 that controls actuator 22 and heater 23 can allow the execution of blocks without having to check the safety of each and every application every time, whereby actuator 22 and/or heater 23 can be prevented from being driven with non-permissible parameters.

For example, in apparatus 20 according to the present embodiment, controller 24 may consult the first rule, and modify the application by changing a parameter included in the first parameter range to a parameter included in a range in which the at least one of actuator 22 or heater 23 is permitted to be driven, and adding a new block to the plurality of blocks.

With this, since a parameter included in the non-permissible first parameter range can be changed to a parameter included in the permissible range, actuator 22 and/or heater 23 can be prevented from being driven with non-permissible parameters. Furthermore, since a new block can be added, it is possible to supplement a function degraded by a parameter change with a new block.

For example, in apparatus 20 according to the present embodiment, controller 24 may modify the application by removing the at least one block including a parameter included in the first parameter range.

With this, since a block including a parameter included in the non-permissible first parameter range can be removed, actuator 22 and/or heater 23 can be prevented from being driven with non-permissible parameters. For example, if actuator 22 and heater 23 are unable to execute the parameter specified by the application developer in the first place, the removal allows the device to be controlled without confusion. On the other hand, the user may be notified of the removal.

For example, in apparatus 20 according to the present embodiment, controller 24 may consult the first rule, determine, for each of a plurality of parameters included in the plurality of blocks, whether the parameter is included in the first parameter range, and when controller 24 determines that the parameter is included in the first parameter range, may change the block including the parameter.

This makes it possible to more reliably change a block including a parameter included in the non-permissible first parameter range.

For example, in apparatus 20 according to the present embodiment, the application may include information on the order in which each of the plurality of blocks is executed and information on the timing of execution of each of the plurality of blocks. The information on the timing for each of the blocks indicates, for example, the amount of time between the start of the block and the start or end of another block (for example, the block that is first in order).

This enables the application to include order and timing information, and to make decisions and execute them sequentially while checking the parameter ranges of each block.

For example, in apparatus 20 according to the present embodiment, the application may include information on the plurality of blocks and information on the order in which each of the plurality of blocks is executed, and when the rule includes information indicating at least one block among the plurality of blocks cannot be executed, the rule may present, to a developer as error information, that the application cannot be developed or information on the block that cannot be executed.

With this, a new block can be added, the order of blocks can be changed, or a block can be removed before the application is executed to ensure that the third block is executed after the second block. Accordingly, the application developer can lower the priority that takes into consideration the safe driving of actuator 22 and heater 23 to more freely develop the application. Furthermore, the developer of the software that is incorporated in apparatus 20 that controls actuator 22 and heater 23 can allow the execution of blocks without having to check the safety of each and every application every time.

For example, in apparatus 20 according to the present embodiment, the first parameter range may be a range of parameters that allow the at least one of actuator 22 or heater 23 to reach its maximum withstand temperature.

This makes it possible to inhibit actuator 22 and/or heater 23 from reaching its maximum withstand temperature when the application is executed, which makes it possible to improve the safety of apparatus 20 controlled by the application.

For example, apparatus 20 according to the present embodiment may include enclosure 21 including an interior space, and the first parameter range may be a range of parameters that allow the interior space to reach its maximum withstand temperature.

This makes it possible to inhibit the interior space of enclosure 21 from reaching its maximum withstand temperature when the application is executed, which makes it possible to improve the safety of apparatus 20 controlled by the application.

Variations of Embodiment 1

Figure 15A:
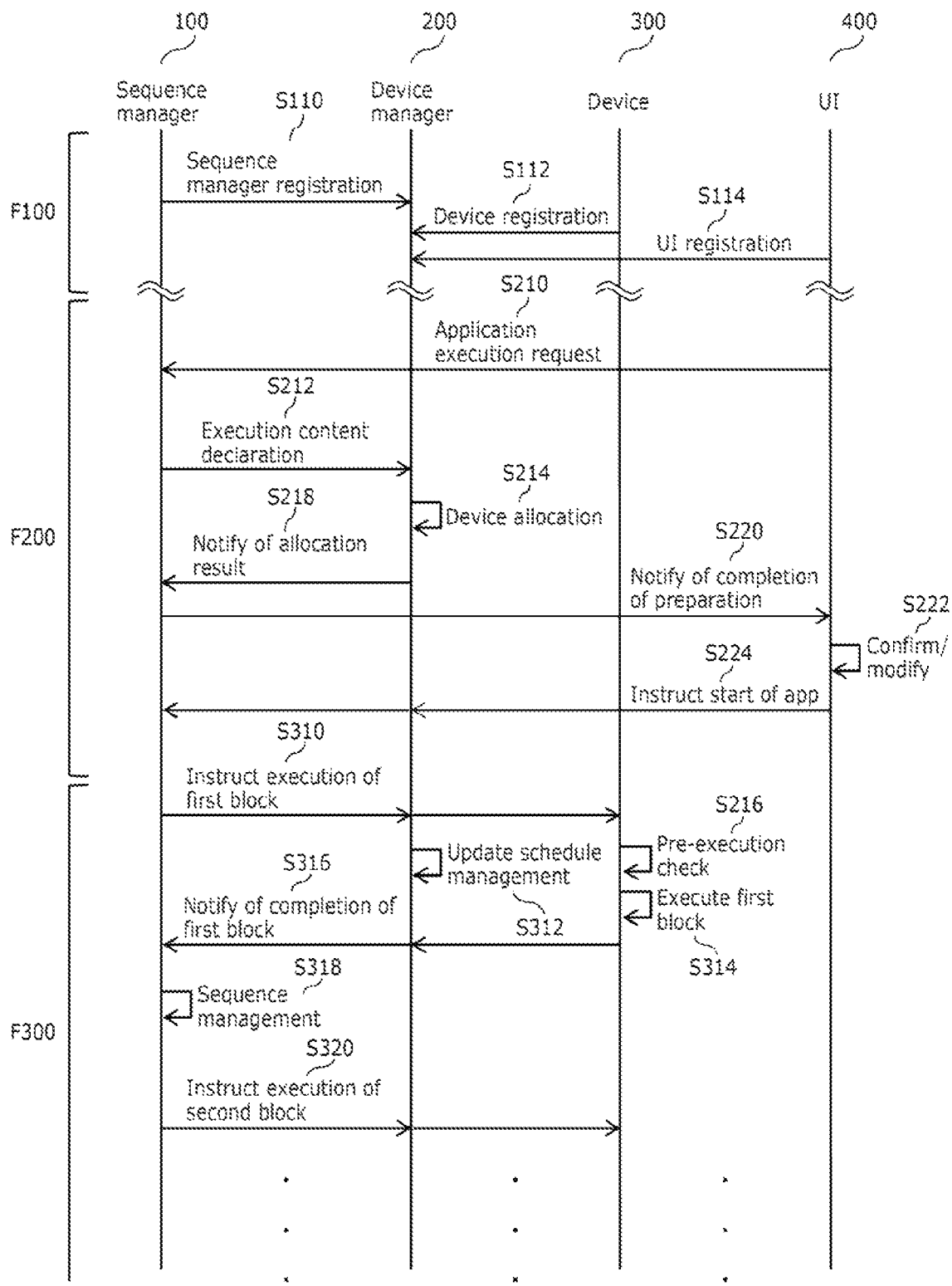
FIG. 15A illustrates a sequence diagram for a system according to Variation 1 of Embodiment 1.

In Embodiment 1, processes performed by system 1 are described with reference to FIG. 8, but the flow of processes is not limited to this example. In particular, regarding the pre-execution check (S216) described in detail, the timing and the main module in which the pre-execution check are performed are not limited to this example. Next, a number of variations of the sequence diagram for system 1 will be described in detail with reference to FIG. 15A through FIG. 15E, FIG. 15A illustrates a sequence diagram for system 1 according to Variation 1 of Embodiment 1. In FIG. 15A, the pre-execution check (S216) is performed by device 300 just before device 300 receives the execution instruction (S310) to execute the block (S314).

This allows the software incorporated in device 300 to be simply configured to perform a pre-execution check just before the execution of a block. Stated differently, steps S215 and S217 can be omitted. As a result, it is no longer necessary to incorporate functions and a communication API for these processes into device 300, and it is therefore possible to reduce memory used by the microcontroller in device 300.

The result of the pre-execution check may be notified to device manager 200 and/or UI 400. For example, device manager 200 or UI 400 may be notified of the result of the check when a parameter change or an instruction to stop execution of a block is made as a result of the pre-execution check.

Figure 15B:
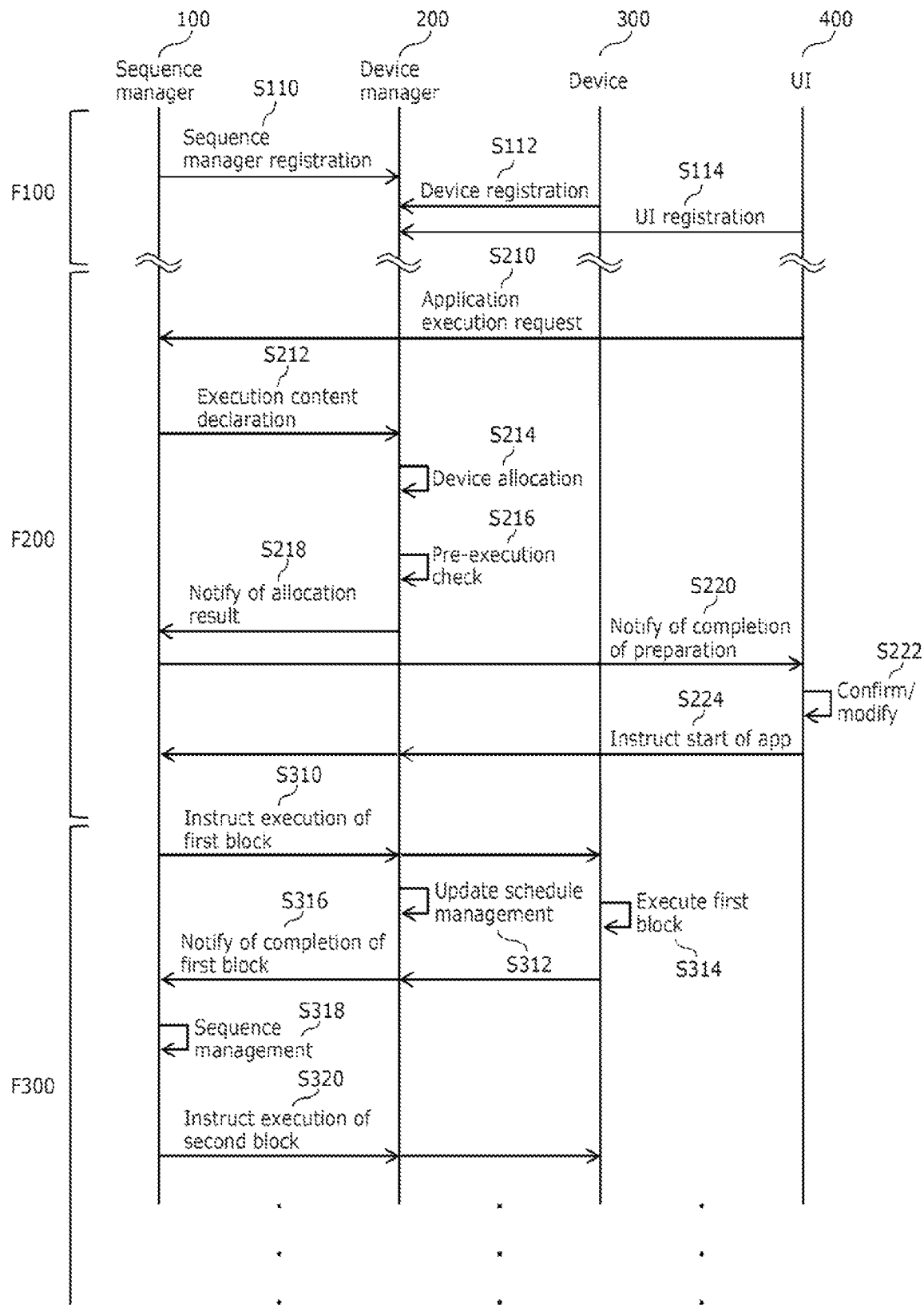
FIG. 15C illustrates a sequence diagram for a system according to Variation 3 of Embodiment 1.
FIG. 15D illustrates a sequence diagram for a system according to Variation 4 of Embodiment 1.
FIG. 15E illustrates a sequence diagram for a system according to Variation 5 of Embodiment 1.

FIG. 15B illustrates a sequence diagram for system 1 according to Variation 2 of Embodiment 1. In FIG. 1513, the pre-execution check (S216) is performed by device manager 200 as it performs the allocation result notification (S218).

With this, the software incorporated in device 300 does not need to include the function for performing the pre-execution check (S216). Thus, the use of memory included in device 300 can be reduced, leading to a cost reduction of device 300.

In Embodiment 1, regarding the block execution (S314) by device 300, the flow of processes performed by instructions from sequence manager 100 implemented in cloud server 10 is described, but the aspect in which the block execution (S314) is performed is also not limited to this example.

For example, the content of the notification from sequence manager 100 may be stored in memory in device 300, and the block may be executed by direct instruction from the user through the UI included in apparatus 20 or UI 400 included in terminal 30. Stated differently, the application may be downloaded to the device and the user may execute the application at any time.

Figure 15C:
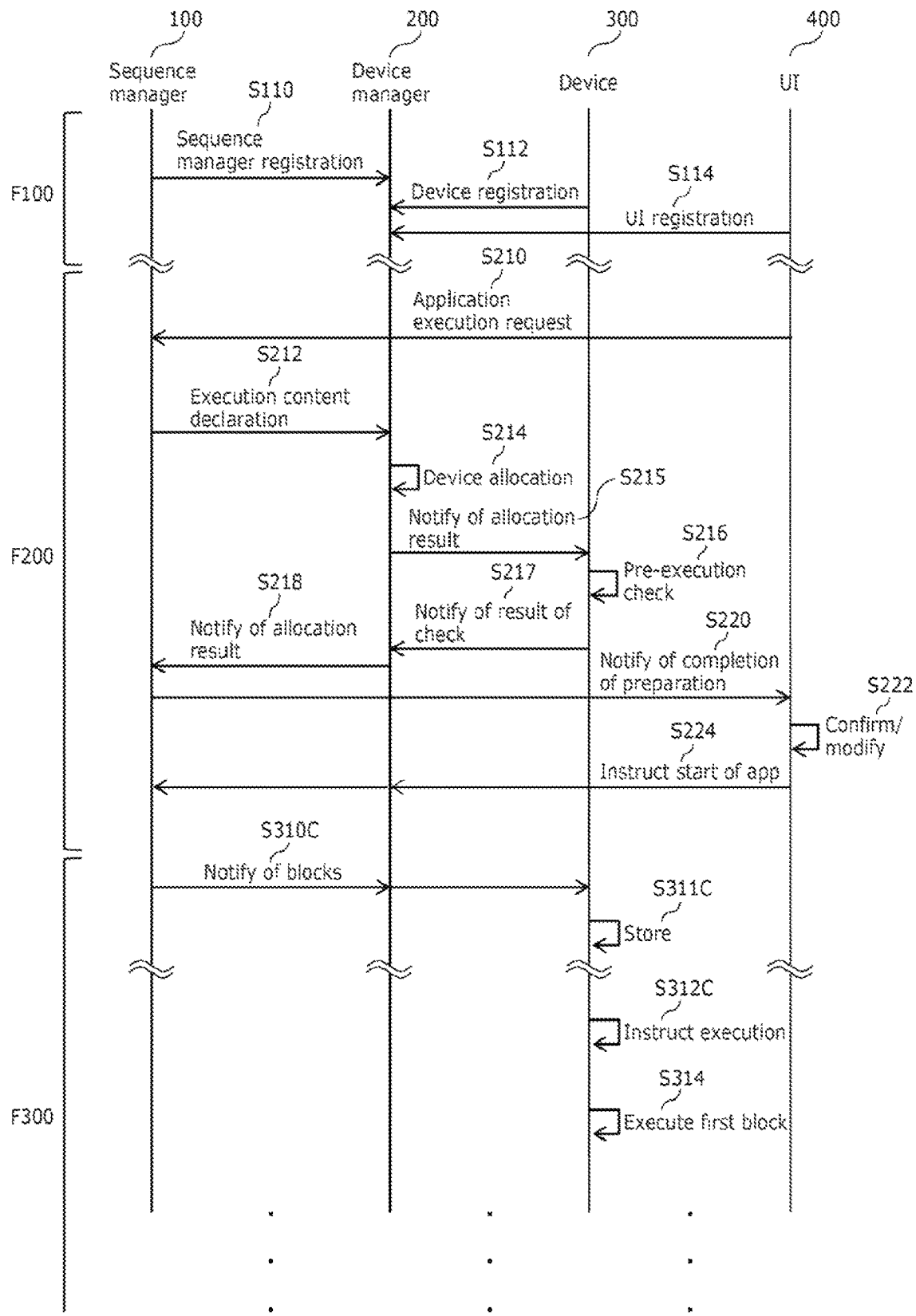

FIG. 15C illustrates a sequence diagram for system 1 according to Variation 3 of Embodiment 1. In FIG. 15C, in app execution phase F300, sequence manager 100 notifies device 300 of one or more blocks to be executed on device 300 (S310C). Device 300 then stores the notified one or more blocks in memory (S311C).

Device 300 then accepts instructions from the user to execute the stored one or more blocks (S312C) and executes the one or more blocks in order starting with the first block (S314).

As described above, by storing the one or more blocks in device 300, device 300 can be controlled without communication between device manager 200 and device 300, thus reducing the risk of device 300 outage or delay due to unstable communication between cloud server 10 and apparatus 20, Therefore, this variation is more effective in environments where communication with cloud server 10 is unreliable and/or in device 300 where device outages or delays during application execution are not tolerated.

Figure 15D:
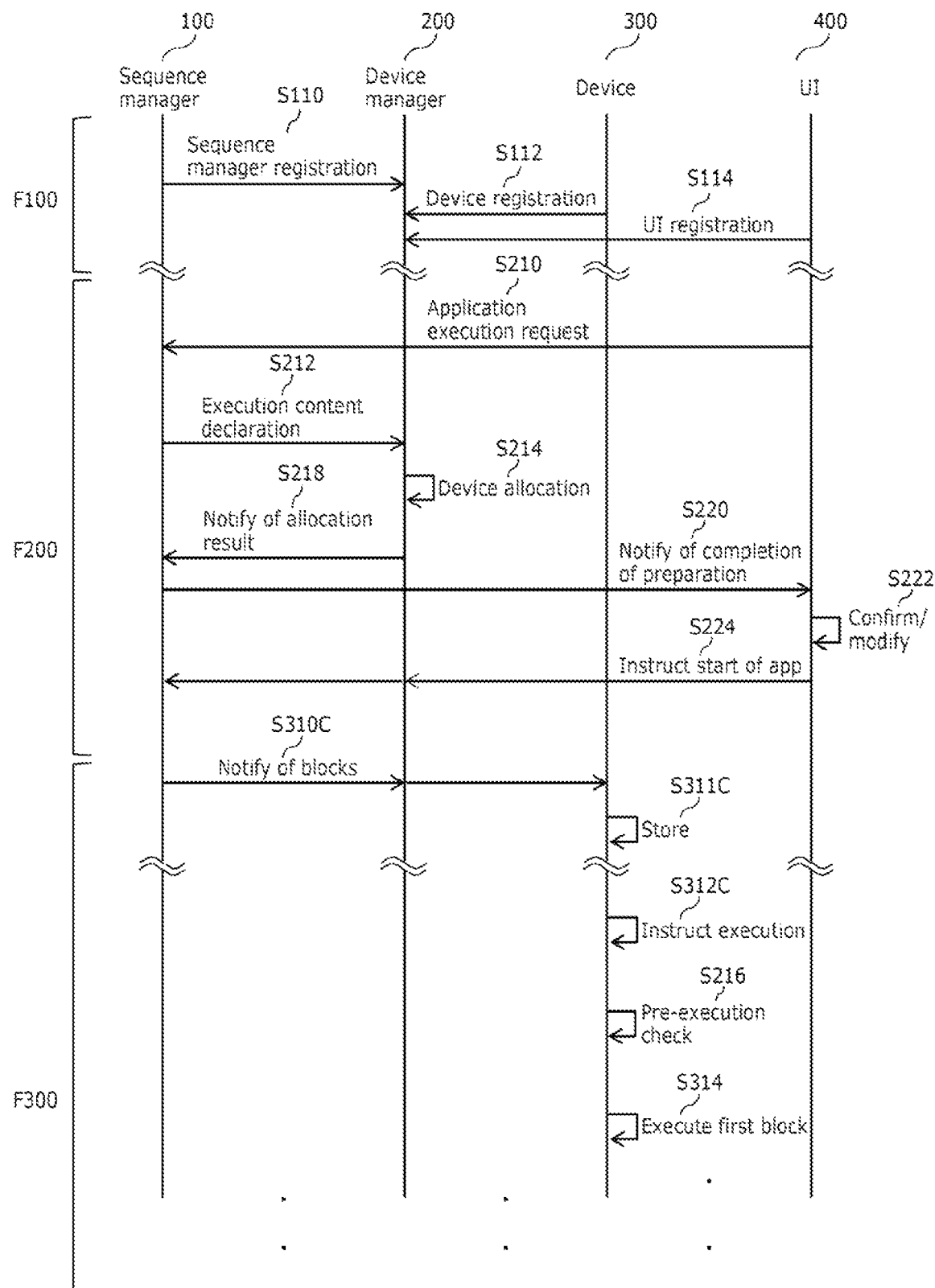

In Variation 3, as in Embodiment 1, the pre-execution check (S216) is also important, but the timing and the main module in which the pre-execution check (S216) is performed are not limited to FIG. 15C, In other words, Variation 3 may be combined with Variation 1 or 2, FIG. 15D illustrates a sequence diagram for system 1 according to Variation 4 of Embodiment 1. Variation 4 corresponds to a combination of Variation 1 and Variation 3. In Variation 4, as illustrated in FIG. 15D, the pre-execution check (S216) is performed by device 300 just after device 300 receives the execution instruction (S312C) and just before device 300 executes the block (S314).

If a block is downloaded to device 300 and the user executes the block at any given time, the possibility of a significant discrepancy between when the block is downloaded and when it is executed increases. Stated differently, the block may be executed, for example, days, months, or years after the block is downloaded to device 300. In such cases, the degradation level, etc., of device 300 may change between the time the block is downloaded and the time the block is executed. Therefore, in device 300—the degradation level of which affects the execution of a block—a pre-execution check is performed by device 300 just before the block is executed, which allows for pre-execution check that is dependent on degradation level.

Figure 15E:
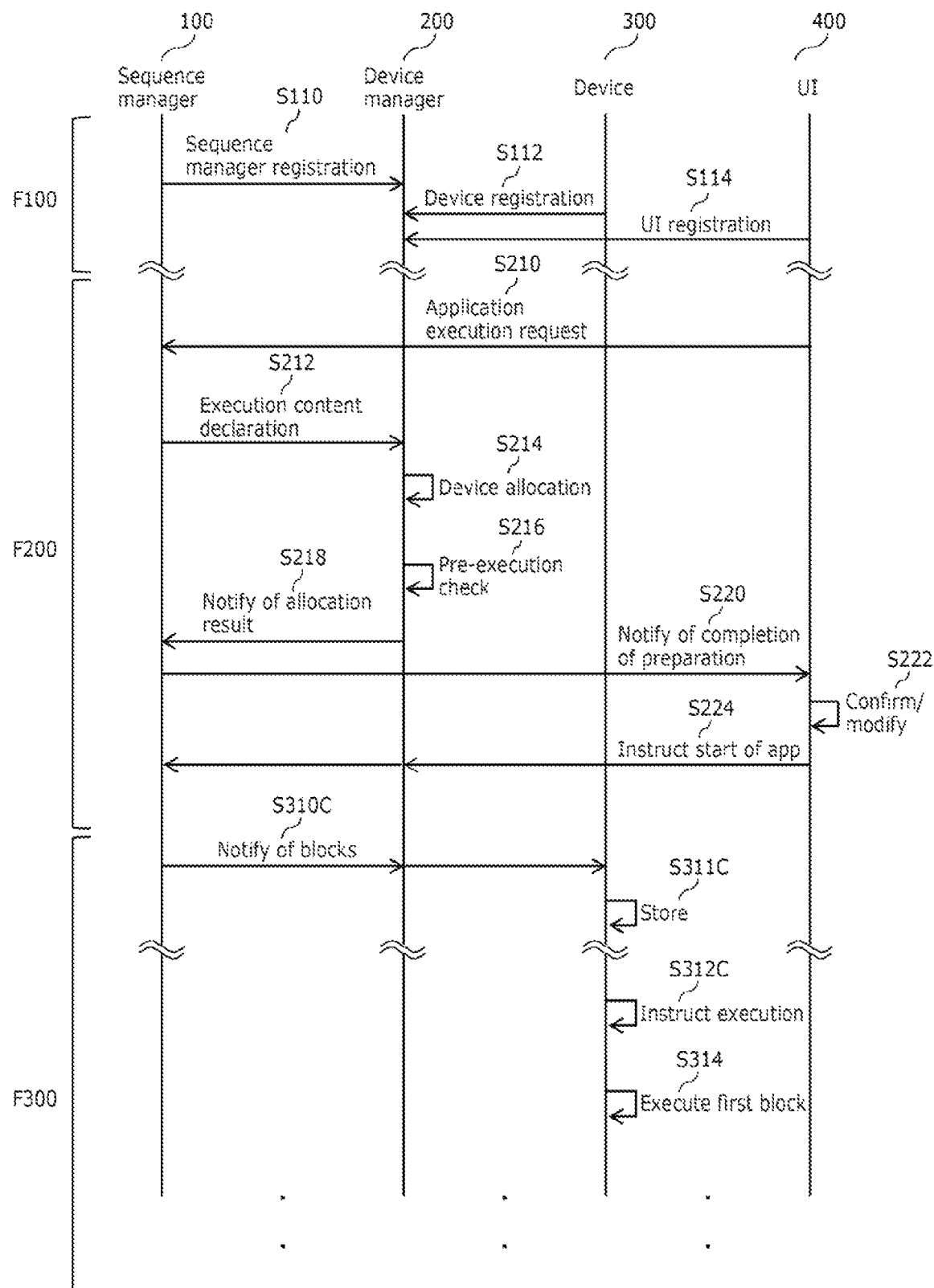

FIG. 15E illustrates a sequence diagram for system 1 according to Variation 5 of Embodiment 1. Variation 5 corresponds to a combination of Variation 2 and Variation 3. In Variation 5, as illustrated in FIG. 15E, the pre-execution check (S216) is performed by device manager 200 as it performs the allocation result notification (S218).

Embodiment 2

Next, Embodiment 2 will be described. The present embodiment differs from Embodiment 1 primarily in that the pre-execution check is skipped when the application is authenticated, Hereinafter, the present embodiment will be described with a focus on the points of difference from Embodiment 1.

The hardware and functional configurations of system 1 according to the present embodiment are the same as in Embodiment 1, Accordingly, repeated illustration in the figures and explanation in the description are omitted.

2.1 Processes

In the present embodiment, the processes are the same as in Embodiment 1 except that step S216 of the pre-execution check in Embodiment 1 is replaced with step S216A. Step S216A of the pre-execution check process will therefore be described with reference to FIG. 16.

Figure 16:
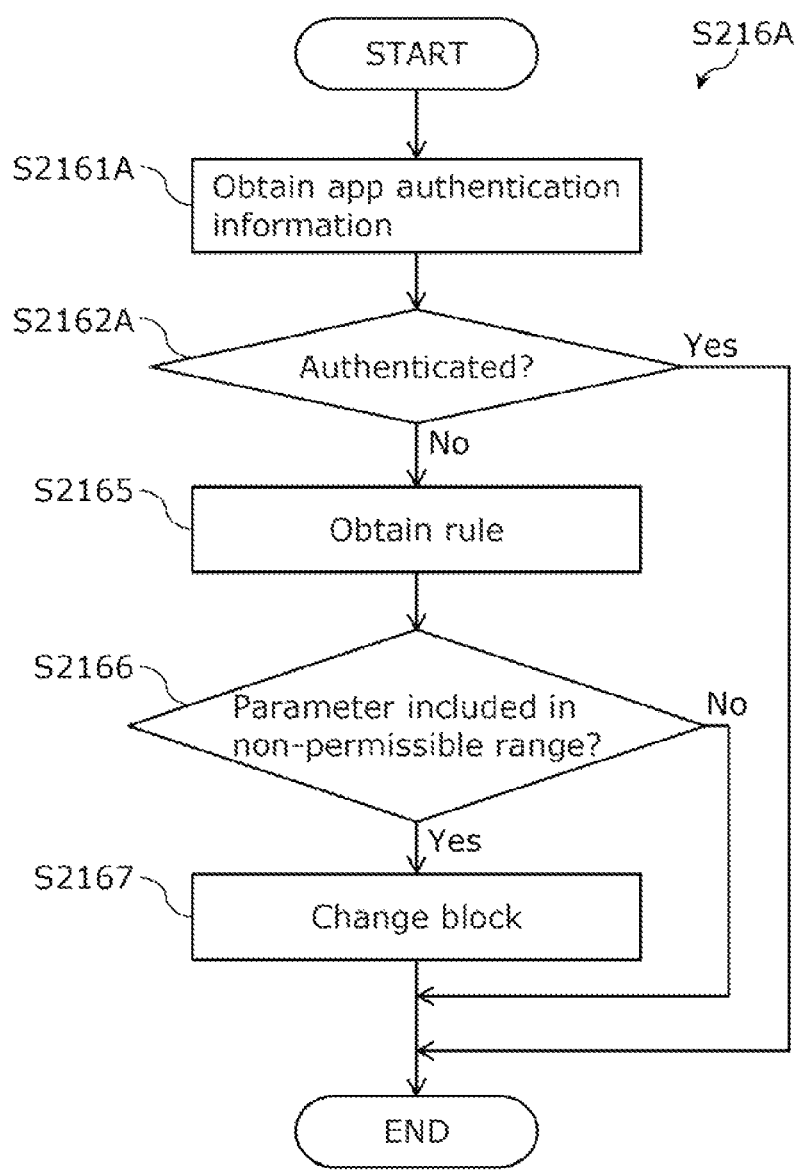
FIG. 16 illustrates a flowchart of a pre-execution check process according to Embodiment 2.

FIG. 16 illustrates a flowchart of the pre-execution check process according to Embodiment 2.

Step S2161A

Device 300 obtains app authentication information. If the application has been authenticated, the app authentication information includes information indicating that the application has been authenticated.

Application authentication is a mechanism for guaranteeing the quality of an application, for example, by enabling confirmation of the application's security and/or identity (i.e., that it has not been tampered with). Next, one example of an application granted with authentication information will be given. If the change history of the application's code indicates that no changes were made to parameter ranges, information indicating that the application has been authenticated is associated with the application.

Step S2162A

Device 300 determines whether the application is authenticated or not based on the retrieved app information. Here, if the application is determined to be authenticated (Yes in S2162A), device 300 skips the subsequent steps S2165 to S2167 and terminates the pre-execution check process. If, however, it is determined that the application is not authenticated (No in S2162A), device 300 proceeds to the next step S2165.

2.2 Advantageous Effects, Etc

As described above, apparatus 20 according to the present embodiment includes: at least one of actuator 22 or heater 23, and controller 24 that controls the at least one of actuator 22 or heater 23. Controller 24 obtains an application that is defined by a plurality of blocks that drive the at least one of actuator 22 or heater 23 and includes information indicating whether the application has been authenticated. Each of the plurality of blocks includes a parameter for driving actuator 22 or heater 23. When the application does not include information indicating that the application has been authenticated, controller 24 consults a first rule that defines a first parameter range within which the at least one of actuator 22 or heater 23 is not permitted to be driven, and modifies the application by changing at least one of the plurality of blocks. The at least one of the plurality of blocks includes a parameter included in the first parameter range. Controller 24 drives the at least one of actuator 22 or heater 23 based on the modified application.

This allows actuator 22 and/or heater 23 to be driven based on an application defined by a plurality of blocks. It is therefore is possible to develop applications using blocks that abstract the control of apparatus 20, allowing a wide variety of applications developed in this manner to be easily executed on apparatus 20, Furthermore, before actuator 22 and/or heater 23 is/are driven based on the application, a block including a parameter in the first parameter range that is not permitted can be changed. Thus, it is possible to inhibit actuator 22 and/or heater 23 from being driven at a non-permissible parameter. Stated differently, it possible to inhibit the execution of an application that cannot control apparatus 20 safely, which makes it possible to improve the safety of apparatus 20 controlled by the application. Furthermore, when the application is not authenticated, processes that involve application modifications can be performed, which reduces the processing load when the application is authenticated. It is therefore not necessary to perform the determination process for the parameter range for all applications, and management through authentication reduces the processing load and facilitates design standards for the parameter range, making it easier and safer for application developers to design.

For example, in apparatus 20 according to the present embodiment, when the application includes information indicating that the application has been authenticated, controller 24 may not consult the first rule and may not modify the application.

This allows the process for changing the blocks to be skipped if the application has already been authenticated, thus reducing the processing load.

Embodiment 3

Next, Embodiment 3 will be described. The present embodiment differs from Embodiment 1 above primarily in that the pre-execution check is skipped when the creator of the application and the producer of the apparatus are the same. Hereinafter, the present embodiment will be described with a focus on the points of difference from Embodiment 1.

The hardware and functional configurations of system 1 according to the present embodiment are the same as in Embodiment 1. Accordingly, repeated illustration in the figures and explanation in the description are omitted.

3.1 Processes

In the present embodiment, the processes are the same as in Embodiment 1 except that step S216 of the pre-execution check in Embodiment 1 above is replaced with step S216B. Step S216B of the pre-execution check process will therefore be described with reference to FIG. 17.

Figure 17:
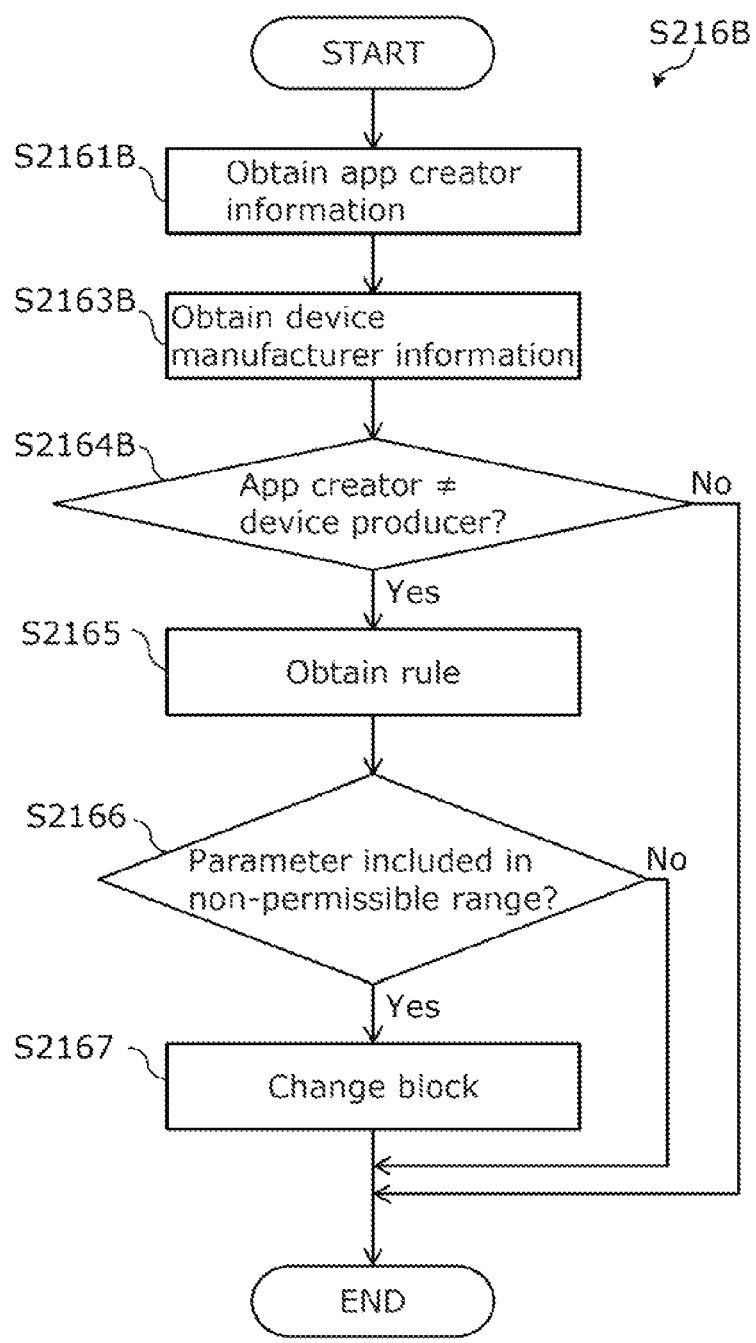
FIG. 17 illustrates a flowchart of a pre-execution check process according to Embodiment 3.

FIG. 17 illustrates a flowchart of the pre-execution check process according to Embodiment 3.

Step S2161B

Device 300 obtains app creator information. The app creator information indicates the creator of the application. Here, "creator" means, for example, the company, individual, or organization that created the application, and may also be referred to as "developer" or "author".

Step S2163B

Device 300 obtains device manufacturer information. The device manufacturer information indicates the producer of the device. Here, "producer" means, for example, the company, individual, or organization that produced device 300 (i.e., apparatus 20), and may also be referred to as "manufacturer".

Step S2164B

Device 300 determines whether the creator of the application is different from the producer of device 300. If the creator of the application is an individual and the producer of device 300 is a company, device 300 may determine that the creator of the application and the producer of device 300 are the same if the company to which the creator of the application belongs and the producer of device 300 match. Device 300 may also determine that the creator of the application and the producer of device 300 are the same if the creator of the application is a development contractor contracted by the producer of device 300.

Here, if the creator of the application and the producer of device 300 are the same (No in S2164B), device 300 skips the subsequent steps S2165 to S2167 and ends the pre-execution check process. If, however, the creator of the application and the producer of device 300 are different (Yes in S2164B), device 300 proceeds to the next step S2165.

3.2 Advantageous Effects, Etc

As described above, apparatus 20 according to the present embodiment includes: at least one of actuator 22 or heater 23; and controller 24 that controls the at least one of actuator 22 or heater 23, Controller 24 obtains an application that is defined by a plurality of blocks that drive the at least one of actuator 22 or heater 23 and includes information indicating a creator of the application. Each of the plurality of blocks includes a parameter for driving actuator 22 or heater 23. Controller 24 obtains the information indicating the producer of apparatus 20, and when the creator of the application and the producer of apparatus 20 are different, controller 24 consults a first rule that defines a first parameter range within which the at least one of actuator 22 or heater 23 is not permitted to be driven, and modifies the application by changing at least one of the plurality of blocks. The at least one of the plurality of blocks includes a parameter included in the first parameter range. Controller 24 drives the at least one of actuator 22 or heater 23 based on the modified application.

This allows the actuator and/or the heater to be driven based on an application defined by a plurality of blocks. It is therefore is possible to develop applications using blocks that abstract the control of apparatus 20, allowing a wide variety of applications developed in this manner to be easily executed on apparatus 20. Furthermore, before actuator 22 and/or heater 23 is/are driven based on the application, a block including a parameter in the first parameter range that is not permitted can be changed, Thus, it is possible to inhibit actuator 22 and/or heater 23 from being driven at a non-permissible parameter. Stated differently, it possible to inhibit the execution of an application that cannot control apparatus 20 safely, which makes it possible to improve the safety of apparatus 20 controlled by the application. Furthermore, when the creator of the application and the manufacturer of apparatus 20 are different, processes that involve application modifications can be performed, which reduces the processing load when the creator of the application and the manufacturer of apparatus 20 are the same.

Embodiment 4

Next, Embodiment 4 will be described. The present embodiment differs from Embodiment 1 primarily in that pre-execution check is performed using a rule corresponding to the degradation level of the apparatus. Hereinafter, the present embodiment will be described with a focus on the points of difference from Embodiment 1.

The hardware and function& configurations of system 1 according to the present embodiment are the same as in Embodiment 1. Accordingly, repeated illustration in the figures and explanation in the description are omitted.

4.1 Processes

Figure 18:
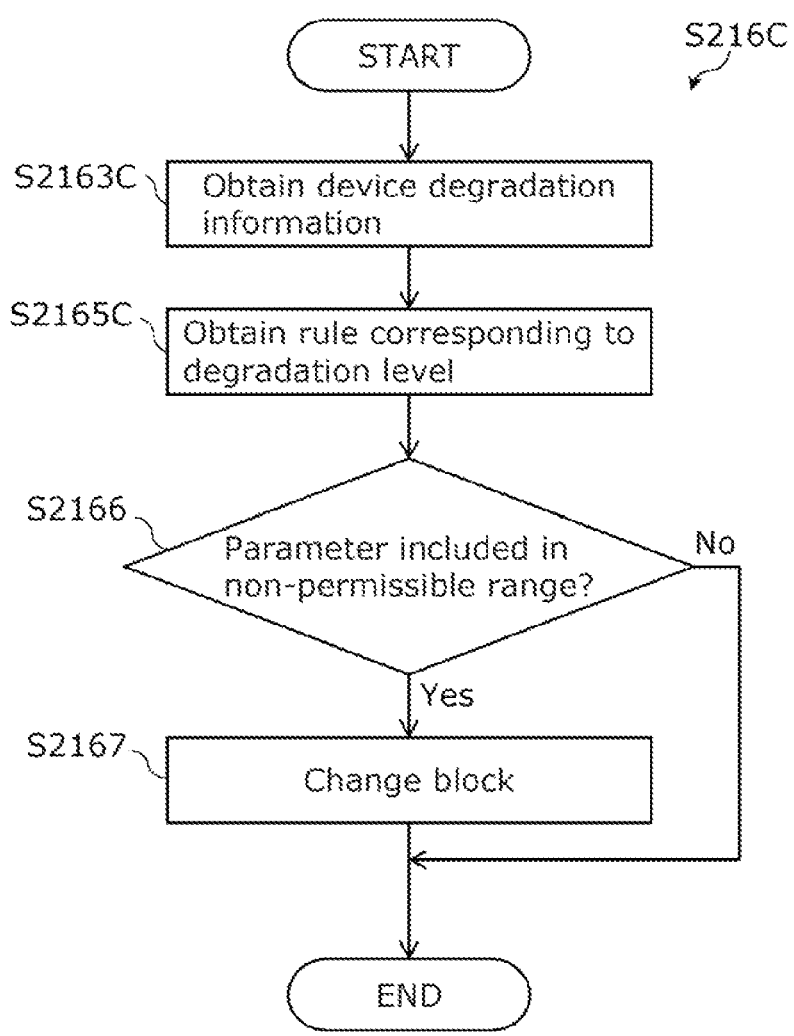
FIG. 18 illustrates a flowchart of a pre-execution check process according to Embodiment 4.

In the present embodiment, the processes are the same as in Embodiment 1 except that step S216 of the pre-execution check in Embodiment 1 above is replaced with step S216C. Step S216C of the pre-execution check process will therefore be described with reference to FIG. 18, FIG. 18 illustrates a flowchart of the pre-execution check process according to Embodiment 4.

Step S21630

Device 300 obtains device degradation information. The device degradation information indicates the degradation level of actuator 22 and/or heater 23 included in apparatus 20. The method of detecting the degradation level is not limited, and can be detected using a sensor, for example.

Step S2165C

Device 300 obtains a rule corresponding to the degradation level. For example, device 300 consults the rule database to obtain a parameter range corresponding to the degradation level of actuator 22 or heater 23 that the block drives.

FIG. 19 illustrates an example of a rule database according to Embodiment 4. Rules 1301C through 1304C are registered in rule database 1300C in FIG. 19. Each of rules 1301C through 1304C includes a parameter range that defines a non-permissible range. For example, rule 1301C includes, as a non-permissible range, a range greater than 1000 rpm for motor MM0001 having a degradation level of 0. For example, rule 1302C includes, as a non-permissible range, a range greater than 800 rpm for motor MM0001 having a degradation level of 1. Stated differently, rule 1302C has a wider non-permissible range and a narrower permissible range than rule 1301C.

Each of rules 1301C through 1304C further includes the type, the manufacturer name, the model number, actuator/heater, and the degradation level. This allows device 300 to obtain, from rule database 1300C, rules corresponding to the degradation level of actuator 22 or heater 23 that is driven by the block. For example, if motor MM0001 driven by the spin block in FIG. 10 has a degradation level of 0, device 300 consults rule database 1300C in FIG. 19 to obtain rule 1301C for the spin block.

An item that determines the degradation level is, for example, the number of times actuator 22 and/or heater 23 included in device 300 has been used, the hours of use, or the number of days used from the start of operation to the present. These items are assumed to increase in an approximately proportional relationship to use by a user. Thus, the rule is defined so that the degradation level increases with each increase in the value corresponding to the item.

Another item that determines the degradation level is, for example, an added value of the temperature of heater 23 or the degree of reproducibility of the input and output of actuator 22 and/or heater 23. The added value of the temperature of heater 23 is the added value of the temperature when heater 23 is driven. For example, the average, intermediate, or maximum temperature of heater 23 during execution of the block is used. The temperature of heater 23 may be the ratio of the execution temperature to the limit temperature of heater 23, or the difference of the execution temperature to the limit temperature of heater 23.

The degree of reproducibility of the input and output of actuator 22 and/or heater 23 is calculated with reference to the relationship between the input value to drive actuator 22 and/or heater 23 and the output of actuator 22 and/or heater 23. The ratio of the actual output value for a given input to the output value specified by the relationship is used.

4.2 Advantageous Effects, Etc

As described above, apparatus 20 according to the present embodiment includes at least one of actuator 22 or heater 23, and controller 24 that controls the at least one of actuator 22 or heater 23, Controller 24 obtains an application defined by a plurality of blocks that drive the at least one of actuator 22 or heater 23. Each of the plurality of blocks includes a parameter for driving the at least one of actuator 22 or heater 23, Controller 24 obtains degradation information indicating whether the at least one of actuator 22 or heater 23 has degraded. When the degradation information indicates that the at least one of actuator 22 or heater 23 has not degraded, controller 24 consults a first rule that defines a first parameter range within which the at least one of actuator 22 or heater 23 is not permitted to be driven, and modifies the application by changing at least one first block included in the plurality of blocks. The at least one first block includes a parameter included in the first parameter range. When the degradation information indicates that the at least one of actuator 22 or heater 23 has degraded, controller 24 consults a second rule that defines a second parameter range within which the at least one of actuator 22 or heater 23 is not permitted to be driven, and modifies the application by changing at least one second block included in the plurality of blocks. The second parameter range is different from the first parameter range. The at least one second block includes a parameter included in the second parameter range. Controller 24 drives the at least one of actuator 22 or heater 23 based on the modified application.

This allows actuator 22 and/or heater 23 to be driven based on an application defined by a plurality of blocks. It is therefore is possible to develop applications using blocks that abstract the control of apparatus 20, allowing a wide variety of applications developed in this manner to be easily executed on apparatus 20, Furthermore, before actuator 22 and/or heater 23 is/are driven based on the application, a block including a parameter in the first parameter range that is not permitted can be changed. Thus, it is possible to inhibit actuator 22 and/or heater 23 from being driven at a non-permissible parameter. Stated differently, it possible to inhibit the execution of an application that cannot control apparatus 20 safely, which makes it possible to improve the safety of apparatus 20 controlled by the application. Furthermore, different parameter ranges dependent on the degradation information of apparatus 20 can be used, and the block can be used to execute drive instructions from the application side to actuator 22 and/or heater 23 while taking into account the performance of the device as it degrades over time, and apparatus 20 controlled by the application can therefore be made more secure.

Other Embodiments

Hereinbefore, a system according to one or more aspects of the present disclosure has been described based on exemplary embodiments, but the present disclosure is not limited to the above exemplary embodiments. Those skilled in the art will readily appreciate that many modifications are possible in the exemplary embodiments without materially departing from the novel teachings and advantages of the present disclosure. Accordingly, all such modifications are intended to be included within one or more aspects of the present disclosure.

In the above exemplary embodiments, sequence manager 100 and device manager 200 are described as, but not limited to, being included in cloud server 10. Sequence manager 100 and/or device manager 200 may be included in apparatus 20, Similarly, although UI 400 is described as being included in terminal 30, UT 400 may be included in apparatus 20.

In the above exemplary embodiments, the application may be modified based on the degradation information. For example, device 300 may consult parameter conversion information that associates a plurality of degradation levels with a plurality of parameter conversion methods, obtain the conversion method corresponding to the degradation level, and convert a parameter included in the block using the obtained conversion method. The conversion method may be defined, for example, by the value after conversion or by the coefficients applied to the value before conversion.

In each of the above embodiments, a block is changed in the pre-execution check when an included parameter is in a non-permissible range, and thereafter the block is executed, but this example is non-limiting. For example, if a parameter is in the non-permissible range, when the state of device 300 is different than expected, the block may not be executed and device manager 200 and/or sequence manager 100 may be notified of the aborted execution (error).

INDUSTRIAL APPLICABILITY

The present disclosure can be used in home appliances or other products that can execute an application defined by a plurality of function blocks.

The invention claimed is:
1. An apparatus comprising:
at least one of an actuator or a heater; and
a controller that controls the at least one of the actuator or the heater, wherein
the controller:
    obtains an application defined by a plurality of blocks that drive the at least one of the actuator or the heater, each of the plurality of blocks including a parameter for driving the at least one of the actuator or the heater;
    consults a first rule that defines a first parameter range within which the at least one of the actuator or the heater is not permitted to be driven, and modifies the application by changing at least one block included in the plurality of blocks, the at least one block including a parameter included in the first parameter range; and
    drives the at least one of the actuator or the heater based on the application modified, wherein
the controller modifies the application by removing the at least one block including a parameter included in the first parameter range.

2. The apparatus according to claim 1, wherein
the controller consults the first rule, and modifies the application by changing a parameter included in the first parameter range to a parameter included in a range within which the at least one of the actuator or the heater is permitted to be driven.

3. The apparatus according to claim 1, wherein
the controller consults the first rule, and modifies the application by changing a parameter included in the first parameter range to a parameter included in a range within which the at least one of the actuator or the heater is permitted to be driven, and adding a new block to the plurality of blocks.

4. The apparatus according to claim 1, wherein
the controller:
    consults the first rule and determines, for each of a plurality of parameters included in the plurality of blocks, whether the parameter is included in the first parameter range; and
    when the parameter is determined to be included in the first parameter range, changes a block including the parameter.

5. The apparatus according to claim 1, wherein
the application includes information on an order in which each of the plurality of blocks is executed and information on timing of execution of each of the plurality of blocks.

6. The apparatus according to claim 1, wherein
the first parameter range is a range of parameters that allow the at least one of the actuator or the heater to reach a maximum withstand temperature.

7. The apparatus according to claim 1, further comprising:
an enclosure including an interior space, wherein
the first parameter range is a range of parameters that allow the interior space to reach a maximum withstand temperature.

8. An apparatus comprising:
at least one of an actuator or a heater; and
a controller that controls the at least one of the actuator or the heater, wherein
the controller:
    obtains an application defined by a plurality of blocks that drive the at least one of the actuator or the heater, the application including information indicating whether the application has been authenticated, each of the plurality of blocks including a parameter for driving the at least one of the actuator or the heater;
    when the application does not include information indicating that the application has been authenticated, consults a first rule that defines a first parameter range within which the at least one of the actuator or the heater is not permitted to be driven, and modifies the application by changing at least one block included in the plurality of blocks, the at least one block including a parameter included in the first parameter range; and drives the at least one of the actuator or the heater based on the application modified, wherein the controller modifies the application by removing the at least one block including a parameter included in the first parameter range.

9. The apparatus according to claim 8, wherein
when the application includes information indicating that the application has been authenticated, the controller does not consult the first rule and does not modify the application.

10. An apparatus comprising:
at least one of an actuator or a heater; and
a controller that controls the at least one of the actuator or the heater, wherein
the controller:
  obtains an application defined by a plurality of blocks that drive the at least one of the actuator or the heater, the application including information indicating a creator of the application, each of the plurality of blocks including a parameter for driving the at least one of the actuator or the heater;
  obtains information indicating a producer of the apparatus;
  when the creator of the application and the producer of the apparatus are different, consults a first rule that defines a first parameter range within which the at least one of the actuator or the heater is not permitted to be driven, and modifies the application by changing at least one block included in the plurality of blocks, the at least one block including a parameter included in the first parameter range; and
  drives the at least one of the actuator or the heater based on the application modified, wherein
the controller modifies the application by removing the at least one block including a parameter included in the first parameter range.

11. An apparatus comprising:
at least one of an actuator or a heater; and
a controller that controls the at least one of the actuator or the heater, wherein
the controller:
  obtains an application defined by a plurality of blocks that drive the at least one of the actuator or the heater, each of the plurality of blocks including a parameter for driving the at least one of the actuator or the heater;
  obtains degradation information indicating whether the at least one of the actuator or the heater has degraded;
  when the degradation information indicates that the at least one of the actuator or the heater has not degraded, consults a first rule that defines a first parameter range within which the at least one of the actuator or the heater is not permitted to be driven, and modifies the application by changing at least one first block included in the plurality of blocks, the at least one first block including a parameter included in the first parameter range;
  when the degradation information indicates that the at least one of the actuator or the heater has degraded, consults a second rule that defines a second parameter range within which the at least one of the actuator or the heater is not permitted to be driven, and modifies the application by changing at least one second block included in the plurality of blocks, the second parameter range being different from the first parameter range, the at least one second block including a parameter included in the second parameter range; and
  drives the at least one of the actuator or the heater based on the application modified.

12. A method for controlling an apparatus including at least one of an actuator or a heater, the method comprising:
  obtaining an application defined by a plurality of blocks that drive the at least one of the actuator or the heater, each of the plurality of blocks including a parameter for driving the at least one of the actuator or the heater;
  consulting a first rule that defines a first parameter range within which the at least one of the actuator or the heater is not permitted to be driven, and modifying the application by changing at least one block included in the plurality of blocks, the at least one block including a parameter included in the first parameter range; and
  driving the at least one of the actuator or the heater based on the application modified, wherein
  the application is modified by removing the at least one block including a parameter included in the first parameter range.

13. A method for controlling an apparatus including at least one of an actuator or a heater, the method comprising:
  obtaining an application defined by a plurality of blocks that drive the at least one of the actuator or the heater, the application including information indicating whether the application has been authenticated, each of the plurality of blocks including a parameter for driving the at least one of the actuator or the heater;
  when the application does not include information indicating that the application has been authenticated, consulting a first rule that defines a first parameter range within which the at least one of the actuator or the heater is not permitted to be driven, and modifying the application by changing at least one block included in the plurality of blocks, the at least one block including a parameter included in the first parameter range; and
  driving the at least one of the actuator or the heater based on the application modified, wherein
  the application is modified by removing the at least one block including a parameter included in the first parameter range.

14. A method for controlling an apparatus including at least one of an actuator or a heater, the method comprising:
  obtaining an application defined by a plurality of blocks that drive the at least one of the actuator or the heater, the application including information indicating a creator of the application, and each of the plurality of blocks including a parameter for driving the at least one of the actuator or the heater;
  obtaining information indicating a producer of the apparatus;
  when the creator of the application and the producer of the apparatus are different, consulting a first rule that defines a first parameter range within which the at least one of the actuator or the heater is not permitted to be driven, and modifying the application by changing at least one block included in the plurality of blocks, the at least one block including a parameter included in the first parameter range; and
  driving the at least one of the actuator or the heater based on the application modified, wherein the application is modified by removing the at least one block including a parameter included in the first parameter range.

15. A method for controlling an apparatus including at least one of an actuator or a heater, the method comprising:
obtaining an application defined by a plurality of blocks that drive the at least one of the actuator or the heater, each of the plurality of blocks including a parameter for driving the at least one of the actuator or the heater;
obtaining degradation information indicating whether the at least one of the actuator or the heater has degraded;
when the degradation information indicates that the at least one of the actuator or the heater has not degraded, consulting a first rule that defines a first parameter range within which the at least one of the actuator or the heater is not permitted to be driven, and modifying the application by changing at least one first block included in the plurality of blocks, the at least one first block including a parameter included in the first parameter range;
when the degradation information indicates that the at least one of the actuator or the heater has degraded, consulting a second rule that defines a second parameter range within which the at least one of the actuator or the heater is not permitted to be driven, and modifying the application by changing at least one second block included in the plurality of blocks, the second parameter range being different from the first parameter range, the at least one second block including a parameter included in the second parameter range; and
driving the at least one of the actuator or the heater based on the application modified.

* * * * *